(12) United States Patent
Chen et al.

(10) Patent No.: US 10,492,169 B2
(45) Date of Patent: Nov. 26, 2019

(54) MITIGATING PAGE COLLISIONS IN DUAL SUBSCRIBER IDENTITY MODULE DEVICES

(71) Applicant: QUALCOMM Incorporated, San Diego, CA (US)

(72) Inventors: Qingxin Chen, San Diego, CA (US); Reza Shahidi, San Diego, CA (US); Jun Hu, San Diego, CA (US); Pavan Kaivaram, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/966,322

(22) Filed: Apr. 30, 2018

(65) Prior Publication Data

US 2018/0368099 A1 Dec. 20, 2018

Related U.S. Application Data

(60) Provisional application No. 62/520,315, filed on Jun. 15, 2017.

(51) Int. Cl.
| | |
|---|---|
| *H04W 68/02* | (2009.01) |
| *H04W 48/18* | (2009.01) |
| *H04W 68/12* | (2009.01) |
| *H04W 88/06* | (2009.01) |
| *H04W 8/18* | (2009.01) |

(52) U.S. Cl.
CPC .......... *H04W 68/02* (2013.01); *H04W 48/18* (2013.01); *H04W 68/12* (2013.01); *H04W 8/183* (2013.01); *H04W 88/06* (2013.01)

(58) Field of Classification Search
CPC ..... H04W 68/02; H04W 48/18; H04W 68/12; H04W 8/183; H04W 88/06
See application file for complete search history.

(56) References Cited

U.S. PATENT DOCUMENTS

| | | |
|---|---|---|
| 8,615,227 B2 | 12/2013 | Su et al. |
| 9,408,183 B2 | 8/2016 | Chirayil |
| 9,872,239 B2 | 1/2018 | Lee |

(Continued)

OTHER PUBLICATIONS

International Search Report and Written Opinion—PCT/US2018/030533—ISA/EPO—dated Jul. 27, 2018.

*Primary Examiner* — Julio R Perez
(74) *Attorney, Agent, or Firm* — Holland & Hart LLP

(57) ABSTRACT

Methods, systems, and devices for wireless communication are described. Some wireless devices (e.g., dual subscriber identity modules (SIM) devices) may support two subscriptions such that while one subscription is actively transmitting or receiving, the other subscription is put on standby. The wireless device may identify collisions in time between monitored paging messages associated with the first and second subscriptions. Accordingly, the wireless device may modify a radio access technology (RAT) priority setting for one of the subscriptions, such that paging messages may be received via a RAT different that the RAT used for the other subscription (e.g., following a cell reselection procedure performed according to the modified RAT priority). Operation using a modified RAT priority setting may be referred to as a fallback mode, which may be exited upon expiration of a timer. Additionally, discontinuous reception (DRX) durations associated with the RATs used for subscription paging may be reduced.

30 Claims, 15 Drawing Sheets

(56) References Cited

U.S. PATENT DOCUMENTS

| | | | |
|---|---|---|---|
| 2010/0202430 A1* | 8/2010 | Chin | H04W 68/12 |
| | | | 370/342 |
| 2013/0244660 A1 | 9/2013 | Kumar et al. | |
| 2014/0106750 A1 | 4/2014 | Roullier et al. | |
| 2015/0141017 A1 | 5/2015 | Krishnamoorthy et al. | |
| 2015/0163827 A1* | 6/2015 | Ekici | H04W 68/02 |
| | | | 370/338 |
| 2015/0350973 A1 | 12/2015 | Yang et al. | |
| 2016/0057724 A1 | 2/2016 | Horn et al. | |
| 2017/0290086 A1 | 10/2017 | Patel et al. | |

\* cited by examiner

MITIGATING PAGE COLLISIONS IN DUAL SUBSCRIBER IDENTITY MODULE DEVICES

CROSS REFERENCES

The present Application for Patent claims priority to U.S. Provisional Patent Application No. 62/520,315 by Chen, et al., entitled "Migrating Page Collisions In Dual Subscriber Identity Module Devices," filed Jun. 15, 2017, assigned to the assignee hereof.

BACKGROUND

The following relates generally to wireless communication, and more specifically to techniques for mitigating page collisions in dual subscriber identity module (SIM) devices.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some cases, UEs may contain one or more SIM cards. A SIM may be an entity or component of the UE that contains identity information which uniquely identifies a subscriber to a particular wireless service of a system or network operator. Dual SIM or multi-SIM UEs may have at least two SIMs, and each SIM may be associated with a different subscription. UEs or other wireless devices may use one or more SIMs, and thus one or more subscriptions, together. In UEs that include only one transceiver, only one of the two subscriptions may be transmitting or receiving radio frequency signals at a time. These devices may be referred to as Dual SIM Dual Standby (DSDS) devices, including single radio DSDS (SR-DSDS) devices, such that while one subscription is actively transmitting or receiving, the other subscription is put on standby. In such cases, some transmissions such as paging messages associated with the subscription that is on standby may be missed by the UE when paging messages for one subscription overlap or collide in time with paging messages for the other subscription. Overlapping transmissions associated with two or more subscriptions may thus result in inefficient paging and decreased system performance. Improved paging techniques for UEs operating with more than one subscription may thus be desired.

SUMMARY

The described techniques relate to improved methods, systems, devices, or apparatuses that support techniques for mitigating page collisions in dual subscriber identify module (SIM) devices. Generally, the described techniques provide for modification of radio access technology (RAT) priority settings such that discontinuous reception (DRX) cycles associated with paging procedures for one subscription avoid overlap with the DRX cycles associated with a second subscription. Specifically, a wireless device (e.g., a user equipment (UE)) may monitor, using a first RAT according to a first paging cycle for the first RAT, for first paging messages from a first network for a first SIM of a UE (e.g., using a single transceiver). Additionally, the UE may monitor for second paging messages from a second network for a second SIM of the UE (e.g., using the same transceiver). The UE may identify collisions in time between the monitored first paging messages and the monitored second paging messages (e.g., the UE may identify paging messages may be occurring while a subscription is in a standby state). The UE may then modify a RAT priority setting for the first SIM to prioritize a second RAT over the first RAT based at least in part on the identified collisions where a first paging cycle for the first RAT has a different time interval than a second paging cycle for the second RAT. In some cases, the second RAT may be Global System for Mobile Communications (GSM), and the first RAT may be another RAT, such as Long Term Evolution (LTE), wideband code division multiple access (WCDMA), or a 5G wireless technology. Described techniques may also provide, in addition to priority modification, for DRX reduction, such that DRX durations may be shortened and paging opportunities may be increased.

A method of wireless communication is described. The method may include monitoring, using a first RAT according to a first paging cycle for the first RAT, for first paging messages from a first network for a first SIM of a UE, monitoring for second paging messages from a second network for a second SIM of the UE, identifying collisions in time between the monitored first paging messages and the monitored second paging messages, and modifying, by the UE, a RAT priority setting for the first SIM to prioritize a second RAT over the first RAT based at least in part on the identified collisions, the first paging cycle for the first RAT having a different time interval than a second paging cycle for the second RAT.

An apparatus for wireless communication is described. The apparatus may include means for monitoring, using a first RAT according to a first paging cycle for the first RAT, for first paging messages from a first network for a first SIM of a UE, means for monitoring for second paging messages from a second network for a second SIM of the UE, means for identifying collisions in time between the monitored first paging messages and the monitored second paging messages, and means for modifying, by the UE, a RAT priority setting for the first SIM to prioritize a second RAT over the first RAT based at least in part on the identified collisions, the first paging cycle for the first RAT having a different time interval than a second paging cycle for the second RAT.

Another apparatus for wireless communication is described. The apparatus may include a processor, memory in electronic communication with the processor, and instructions stored in the memory. The instructions may be operable to cause the processor to monitor, using a first RAT according to a first paging cycle for the first RAT, for first paging messages from a first network for a first SIM of a UE, monitor for second paging messages from a second network for a second SIM of the UE, identify collisions in time between the monitored first paging messages and the monitored second paging messages, and modify, by the UE, a RAT priority setting for the first SIM to prioritize a second RAT over the first RAT based at least in part on the identified collisions, the first paging cycle for the first RAT having a different time interval than a second paging cycle for the second RAT.

A non-transitory computer readable medium for wireless communication is described. The non-transitory computer-readable medium may include instructions operable to cause a processor to monitor, using a first RAT according to a first paging cycle for the first RAT, for first paging messages from a first network for a first SIM of a UE, monitor for second paging messages from a second network for a second SIM of the UE, identify collisions in time between the monitored first paging messages and the monitored second paging messages, and modify, by the UE, a RAT priority setting for the first SIM to prioritize a second RAT over the first RAT based at least in part on the identified collisions, the first paging cycle for the first RAT having a different time interval than a second paging cycle for the second RAT.

Some examples of the method, apparatus, and non-transitory computer-readable medium described above may further include processes, features, means, or instructions for receiving paging messages from the first network for the first SIM using the second RAT based at least in part on the modified RAT priority setting.

Some examples of the method, apparatus, and non-transitory computer-readable medium described above may further include processes, features, means, or instructions for starting a timer based at least in part on the modified RAT priority setting. Some examples of the method, apparatus, and non-transitory computer-readable medium described above may further include processes, features, means, or instructions for restoring, upon expiration of the timer, the RAT priority setting for the first SIM to prioritize the first RAT over the second RAT.

Some examples of the method, apparatus, and non-transitory computer-readable medium described above may further include processes, features, means, or instructions for identifying a change in a mobility condition of the UE. Some examples of the method, apparatus, and non-transitory computer-readable medium described above may further include processes, features, means, or instructions for starting a timer for the UE to remain in a wait state based at least in part on the identified change.

Some examples of the method, apparatus, and non-transitory computer-readable medium described above may further include processes, features, means, or instructions for identifying, while the timer may be active, further collisions between the monitored first paging messages and the monitored second paging messages. Some examples of the method, apparatus, and non-transitory computer-readable medium described above may further include processes, features, means, or instructions for maintaining the modified RAT priority setting for the first SIM to prioritize the second RAT over the first RAT based at least in part on the identified further collisions.

Some examples of the method, apparatus, and non-transitory computer-readable medium described above may further include processes, features, means, or instructions for identifying, while the timer may be active, that the second RAT for the first SIM may be active. Some examples of the method, apparatus, and non-transitory computer-readable medium described above may further include processes, features, means, or instructions for maintaining the modified RAT priority setting for the first SIM to prioritize the second RAT over the first RAT based at least in part on the identification that the second RAT may be active for the first SIM.

Some examples of the method, apparatus, and non-transitory computer-readable medium described above may further include processes, features, means, or instructions for restoring, upon expiration of the timer, the RAT priority setting for the first SIM to prioritize the first RAT over the second RAT.

In some examples of the method, apparatus, and non-transitory computer-readable medium described above, the change in the mobility condition of the UE includes the first RAT or a third RAT may be active for the first SIM, a discontinuous reception cycle for the second SIM change, a RAT used by the second SIM change, a discontinuous reception cycle for the first RAT or a third RAT for the first SIM change, or some combination thereof.

Some examples of the method, apparatus, and non-transitory computer-readable medium described above may further include processes, features, means, or instructions for identifying, while the timer may be active, further collisions between the monitored first paging messages and the monitored second paging messages. Some examples of the method, apparatus, and non-transitory computer-readable medium described above may further include processes, features, means, or instructions for identifying, while the timer may be active, that the first SIM of the UE may be using a third RAT. Some examples of the method, apparatus, and non-transitory computer-readable medium described above may further include processes, features, means, or instructions for modifying, by the UE, the RAT priority setting for the first SIM to prioritize the first RAT over the second RAT and the third RAT based at least in part on the identified collisions and the identification that the first SIM may be using the third RAT while the timer may be active.

Some examples of the method, apparatus, and non-transitory computer-readable medium described above may further include processes, features, means, or instructions for identifying, while the timer may be active, that the second RAT for the first SIM may be active. Some examples of the method, apparatus, and non-transitory computer-readable medium described above may further include processes, features, means, or instructions for identifying, while the timer may be active, that the first RAT for the first SIM may have a highest priority of the RAT priority setting. Some examples of the method, apparatus, and non-transitory computer-readable medium described above may further include processes, features, means, or instructions for modifying, by the UE, the RAT priority setting for the first SIM to prioritize the first RAT over the second RAT and a third RAT based at least in part on the identification that the second RAT may be active for the first SIM and the identification that the first SIM may be using the third RAT while the timer may be active.

Some examples of the method, apparatus, and non-transitory computer-readable medium described above may further include processes, features, means, or instructions for reducing a discontinuous reception period for the first SIM based at least in part on the identified collisions.

In some examples of the method, apparatus, and non-transitory computer-readable medium described above, reducing the discontinuous reception period based at least in part on the identified collisions comprises: transmitting, to the first network, a request for a reduced discontinuous reception period for the first SIM based at least in part on the identified collisions. Some examples of the method, apparatus, and non-transitory computer-readable medium described above may further include processes, features, means, or instructions for receiving, from the first network, an assignment of the reduced discontinuous reception period for the first SIM.

Some examples of the method, apparatus, and non-transitory computer-readable medium described above may further include processes, features, means, or instructions for performing a reselection procedure with the first network using the second RAT based at least in part on the modified RAT priority setting.

In some examples of the method, apparatus, and non-transitory computer-readable medium described above, identifying collisions between the monitored first paging messages and the monitored second paging messages comprises: identifying that a paging block rate for the monitored first paging messages, or the monitored second paging messages, or a combination thereof, exceeds a predetermined threshold.

Some examples of the method, apparatus, and non-transitory computer-readable medium described above may further include processes, features, means, or instructions for receiving one or more system information blocks for the first SIM that indicate priority settings for the first RAT and the second RAT, wherein modifying the RAT priority setting for the first SIM comprises overriding the indicated priority setting for the first RAT, or the indicated priority setting for the second RAT, or a combination thereof.

In some examples of the method, apparatus, and non-transitory computer-readable medium described above, the received one or more system information blocks comprise: a system information block for reselection to an evolved universal terrestrial radio access (E-UTRA) cell, a system information block for reselection to a universal terrestrial radio access network (UTRAN) cell, a system information block for reselection to a GSM enhanced data rates for GSM evolution (EDGE) radio access network (GERAN) cell, or some combination thereof.

In some examples of the method, apparatus, and non-transitory computer-readable medium described above, the UE monitors for the first paging messages from the first network for the first SIM and the second paging messages from the second network for the second SIM using a single radio of the UE.

In some examples of the method, apparatus, and non-transitory computer-readable medium described above, the first RAT may be one of LTE, WCDMA, GSM, and 5G wireless technology. In some examples of the method, apparatus, and non-transitory computer-readable medium described above, the second RAT may be one of LTE, WCDMA, GSM, and 5G wireless technology, wherein the first RAT may be different from the second RAT.

In some examples of the method, apparatus, and non-transitory computer-readable medium described above, the first paging cycle for the first RAT is a non-integer multiple of the second paging cycle for the second RAT.

In some examples of the method, apparatus, and non-transitory computer-readable medium described above, monitoring for the second paging messages comprises: monitoring for the second paging messages from the second network for the second SIM of the UE using the first RAT.

In some examples of the method, apparatus, and non-transitory computer-readable medium described above, the first SIM may be a voice subscription and the second SIM may be a dedicated data subscription or the first SIM may be the dedicated data subscription and the second SIM may be the voice subscription.

In some examples of the method, apparatus, and non-transitory computer-readable medium described above, monitoring for second paging messages comprises: monitoring, using a third RAT, for the second paging messages from the second network for the second SIM of the UE.

In some examples of the method, apparatus, and non-transitory computer-readable medium described above, modifying the RAT priority setting for the first SIM to prioritize the second RAT over the first RAT comprises: removing the first RAT from a RAT capability list based at least in part on the identified collisions.

Some examples of the method, apparatus, and non-transitory computer-readable medium described above may further include processes, features, means, or instructions for performing a cell selection procedure with the first network for the first SIM based at least in part on removing the first RAT from the RAT capability list.

DETAILED DESCRIPTION

Figure 1:
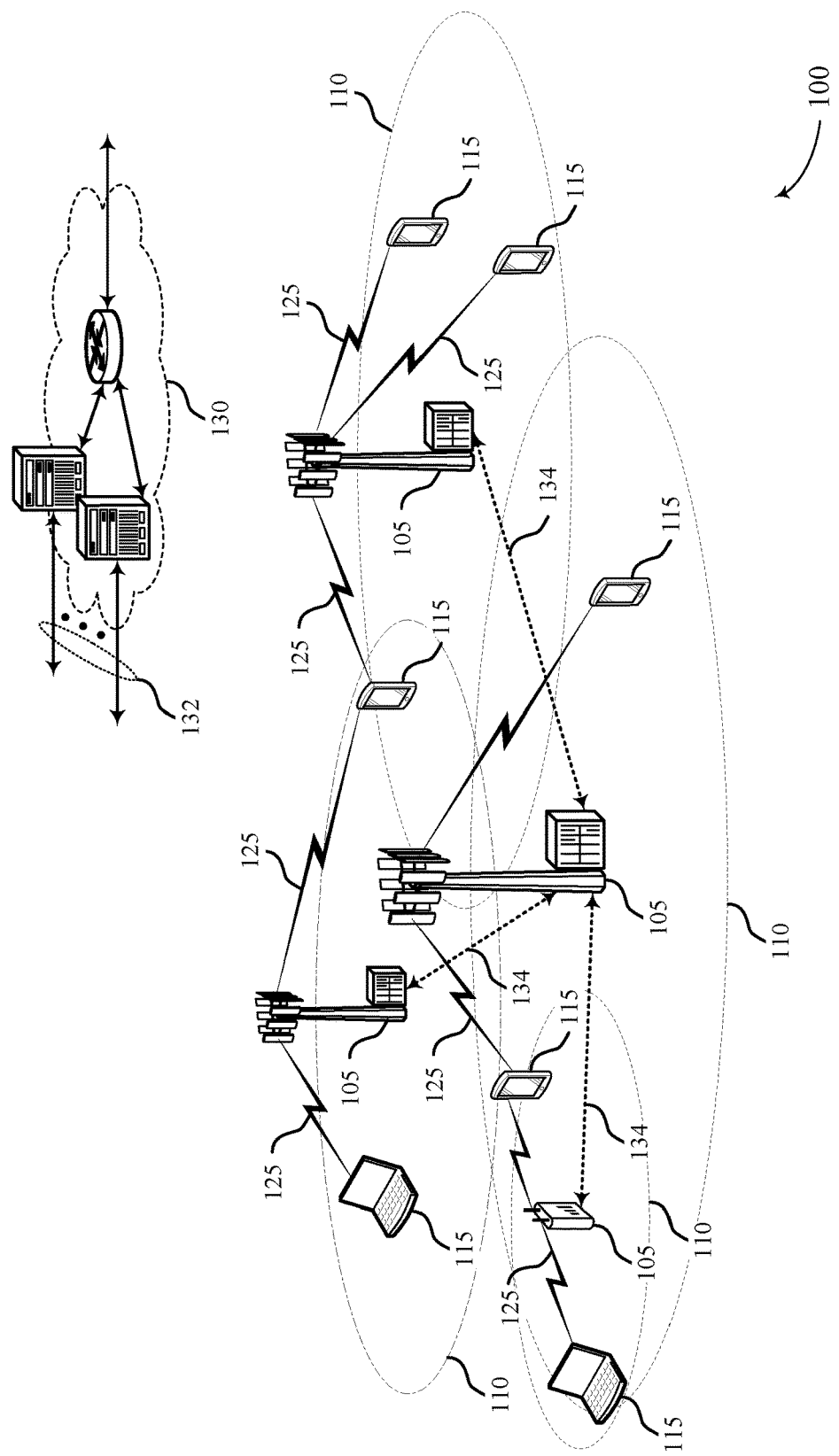
FIG. 1 illustrates an example of a system for wireless communication that supports techniques for mitigating page collisions in dual subscriber identity module (SIM) devices in accordance with aspects of the present disclosure.

The described techniques relate to improved methods, systems, devices, or apparatuses that support techniques for mitigating page collisions in dual subscriber identity module (SIM) devices. As indicated above, user equipment (UEs) supporting more than one subscription (e.g., dual SIM devices) may monitor for paging messages associated with the more than one subscription. In some cases, the UEs may experience paging issues due to, for example, one or more of single radio operation for both subscriptions, paging message collisions (e.g., paging message overlap), lack of paging coordination between different subscription operators, etc. That is, a dual SIM UE may be paged by two operators (e.g., associated with the two different subscriptions) during the same time (e.g., if both UE subscriptions utilize radio access technologies (RATs) that are associated with similar paging or discontinuous reception (DRX) cycles). For example, a dual SIM UE may monitor for paging messages from two subscriptions (e.g., a Dual SIM Dual Standby (DSDS) UE) using a single radio, and the paging messages may be associated with different frequency bands or channels (e.g., depending on the subscription the paging message is associated with). As such, paging messages from different subscriptions that overlap in time may be missed, as one subscription may be in a standby mode during paging and miss a page for that subscription.

In some cases, wakeup or paging cycles for different subscriptions may be associated with a radio access technology (RAT) utilized by the UE and the subscription. When persistent or contiguous collisions of paging messages occur, UEs may be unable to successfully decode paging messages, resulting in inefficient operation. In some cases, different RATs may use different DRX cycles, or have different sets of DRX cycles available as configuration options. As such, UEs may reassign RAT priority (e.g., a preference for Long Term Evolution (LTE), wideband code division multiple access (CDMA), Global System for Mobile Communications (GSM), etc., expressed during a cell reselection procedure) associated with one or more of the at least two subscriptions employed. Therefore, additional subscriptions (e.g., additional subscriptions beyond a primary subscription) may select RATs during cell reselection according to a modified RAT priority setting, such that RATs with different DRX cycles are prioritized compared to DRX cycles used for the primary subscription. Such RAT prioritization may increase the likelihood of offset paging cycles associated with the subscriptions, thus reducing the occurrence of paging message collision.

RAT reprioritization (e.g., modification of RAT priority settings) by a UE may be referred to as a UE operating in a fallback mode or a fallback state. A UE may, by default, operate according to a normal state or default mode where RATs are prioritized for cell reselection according to criteria that does not take dual subscription paging collisions into account (e.g., RAT throughput, service requirements, etc.). Upon detection of a persistent paging collision condition, the UE may transition to a fallback mode. The UE may remain in the fallback mode until the expiration of a timer, at which point the UE may revert back to the default mode of operation. Additionally or alternatively, DRX reduction techniques may be employed, such that DRX durations associated with one or more of the supported subscriptions are reduced, resulting in more frequent paging opportunities.

Aspects of the disclosure are initially described in the context of a wireless communications system. Example state diagrams (e.g., fallback state machines) and process flows implementing discussed techniques are then described. Aspects of the disclosure are further illustrated by and described with reference to apparatus diagrams, system diagrams, and flowcharts that relate to techniques for mitigating page collisions in dual SIM devices.

FIG. 1 illustrates an example of a wireless communications system 100 for mitigating page collisions in dual SIM devices in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. In some cases, wireless communications system 100 may be an example of an IoT system for shared radio frequency spectrum. In shared radio frequency spectrum systems, base stations 105 may transmit acquisition signals over a shared spectrum to UEs 115. The acquisition signals may be based on an LBT mode of the base station 105.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an IoT device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and a network device such as base station 105-c, network device such as base station 105-b, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 kHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ LBT procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Each UE 115 may contain one or more SIMs. A SIM may be an entity or component of the UE 115 that contains the International Mobile Subscriber Identity (IMSI), which uniquely identifies a subscriber to a particular wireless service of a system operator. Without a valid IMSI, service may not be accessible. The SIM may provide a means to authenticate the user, but it may also store other subscriber-related information or applications, such as text messages and phone book contacts. A UE 115 may have a subscription to access a particular network or system, and the subscription may be associated with access credentials, user information, billing or charging information, usage information, or the like, for a user. Each SIM may be associated with and include information, access credentials, etc. for a system. In some systems, such as UMTS and LTE, a universal subscriber identity module (USIM) may perform the same or similar functions of a SIM. As used herein, subscriber identity module or SIM may refer to a universal subscriber identity module or USIM.

A SIM may be an integrated circuit that securely stores the IMSI and the related key used to identify and authenticate UE 115. SIM may also contain a unique serial number (e.g., an integrated circuit card ID (ICCID)), security authentication and ciphering information, temporary information related to the local network, a list of the services, a personal identification number (PIN), and a personal unblocking code (PUK) for PIN unlocking. In some cases, a SIM may be a circuit embedded in a removable plastic card. Dual-SIM or multi-SIM UEs 115 may have at least two SIMs, and each SIM may be associated with a subscription. UEs 115 may use one or more SIMs, and thus one or more subscriptions simultaneously.

A Dual SIM wireless device is one which can hold two SIM cards, which means the device may handle two different network subscriptions. Each network subscription may be associated with, for example, a telephone number. Dual SIM Dual Standby (DSDS) devices may refer to UEs 115 that include only one transceiver, such that only one of the two subscriptions may be transmitting or receiving signals at a time. As such, while one subscription (e.g., a primary subscription) is actively transmitting or receiving the other subscription may be put on standby. In contrast, in wireless devices that include two transceivers and two SIM cards, referred to as Dual SIM Dual Active (DSDA) devices, both subscriptions may be actively transmitting or receiving at the same time.

Although DSDS devices may be configured with two different network subscriptions (one for each SIM) only one of those subscriptions may support a data connection. Unlike voice services that have a specific phone number associated with each subscription, having data services on one subscription is often sufficient to provide all the data services needed by the user independent of the other subscription. For example, in some configurations a DSDS UE may have one network subscription for both data and voice services and another subscription intended for only providing voice communications. Data services activated on one subscription and the corresponding network subscription for such data services are referred to herein as the primary subscription or the dedicated data subscription (DDS). Services that support voice calls only are often referred to as voice-only services or non-DDS services. Such subscription schemes may be elected or chosen based on data/voice plan costs and/or reliability.

Wireless communications system 100 may support RAT reprioritization by DSDS UEs 115 (e.g., UEs 115 may support fallback mode or a fallback state operation). A UE 115 may, by default, operate according to a normal state where RATs are prioritized for cell reselection according to criteria that does not take dual subscription paging collisions into account (e.g., RAT prioritization may be based on system throughput, service requirements, etc.). Upon detection of a persistent paging collision condition, UEs 115 may transition to a fallback mode. UEs 115 may remain in the fallback mode until the expiration of a timer, at which point UEs 115 may revert back to the default mode of operation.

Wireless communications system may also support DRX reduction techniques as described herein.

Figure 2:
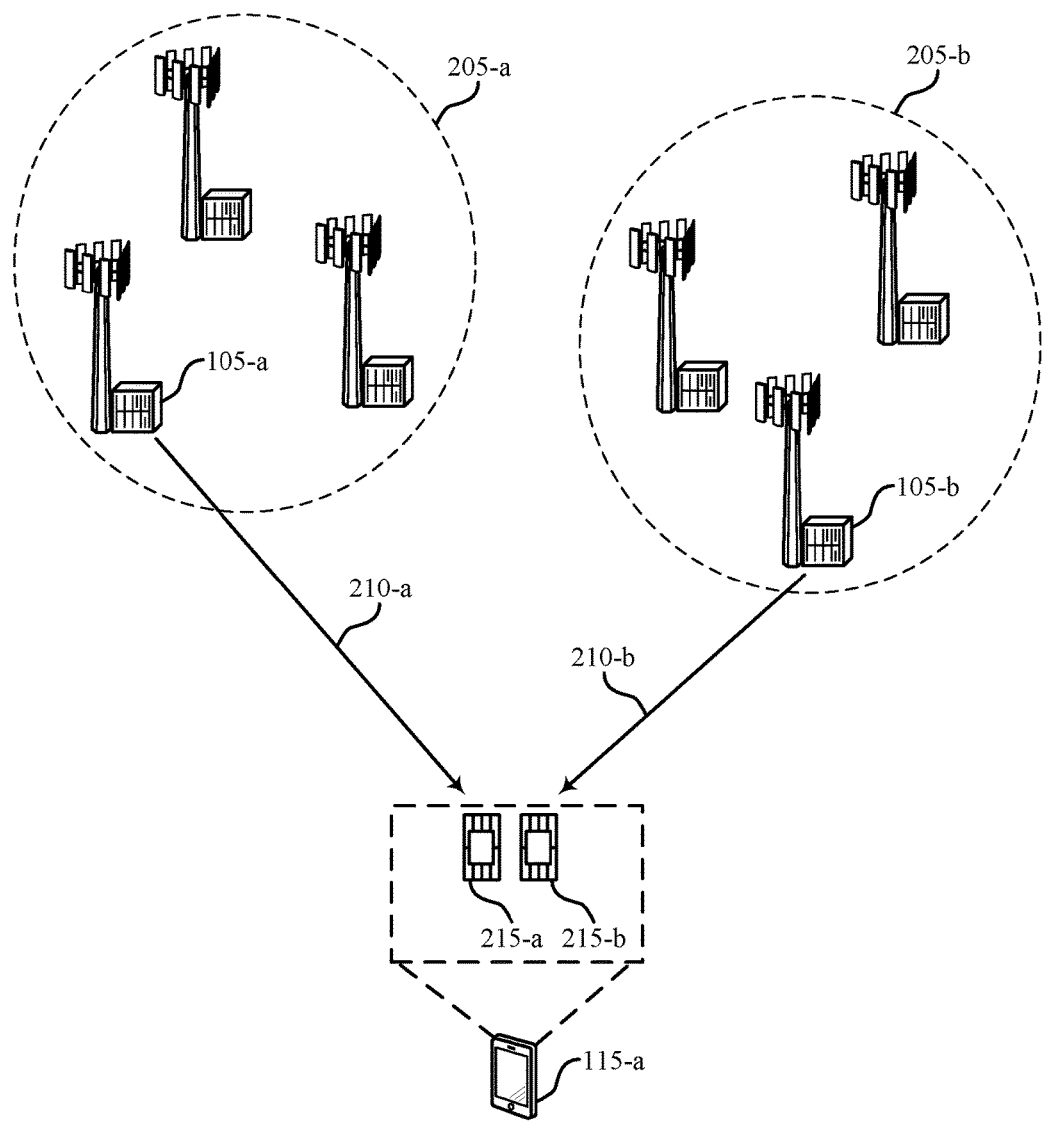
FIG. 2 illustrates an example of a wireless communications system that supports techniques for mitigating page collisions in dual SIM devices in accordance with aspects of the present disclosure.

FIG. 2 illustrates an example of a wireless communications system 200 that supports techniques for mitigating page collisions in dual SIM devices in accordance with various aspects of the present disclosure. In some examples, wireless communications system 200 may include base station 105-*a*, base station 105-*b*, and UE 115-*a*, which may be examples of base stations 105 and a UE 115, as described with reference to FIG. 1. Wireless communications system 200 may include two networks 205 in communication with a dual SIM UE 115-*a*. Specifically, wireless communications system 200 may include network 205-*a* that may be associated with a first subscription. Base station 105-*a* may be a part of network 205-*a* and may transmit paging messages 210-*a* to UE 115-*a* via SIM card 215-*a*. Wireless communications system 200 may further include network 205-*b* that may be associated with a second subscription. Base station 105-*b* may be a part of network 205-*b* and may transmit paging messages 210-*b* to UE 115-*a* via SIM card 215-*b*.

In some cases, additional hardware (e.g., additional radios) may be added in manufacturing of dual SIM UEs 115 (e.g., such as a DSDA UE 115), such that paging for each subscription may be monitored simultaneously using the different receivers. However, such additional hardware may increase costs associated with production of the UEs 115. Alternative methods described herein may thus mitigate paging collisions for single radio dual SIM UEs 115, while maintaining lower production cost relative to dual SIM UEs with multiple radios. Such techniques may include changing RAT priority associated with paging by one or more of the at least two subscriptions. In some cases the dual SIM UEs may also negotiate with the base station to attempt to gain a shorter DRX cycle (e.g., increasing the number of paging opportunities within a particular time period, etc.) as further discussed in more detail below.

UE 115-*a* may be an example of a DSDS UE such that one subscription may be in a standby state while the other subscription is actively communicating with a network (e.g., monitoring for paging messages). In scenarios where network 205-*a* and network 205-*b* operate using the same RAT or RATs with similar DRX cycles, paging messages 210-*a* and paging messages 210-*b* may overlap in time. In such scenarios, one subscription (e.g., associated with SIM card 215-*b*) may miss paging messages (e.g., paging messages 210-*b*) due to a standby state, as a second subscription (e.g., associated with SIM card 215-*a*) may be utilizing receiver resources. Therefore, according to techniques described herein, UE 115-*a* may enter a fallback state upon detection of a persistent paging message collision scenario. In the fallback state, UE 115-*a* may prioritize RATs during cell reselection such that a second subscription (e.g., associated with SIM card 215-*b*) may prioritize RATs according to DRX cycles such that paging message overlap may be reduced.

For example, UE 115-*a* may support two subscriptions (e.g., using SIM card 215-*a* and SIM card 215-*b*) that may use the same RAT (e.g., both using LTE) or RATs with similar DRX cycles. For example LTE and WCDMA may have DRX cycles on time resources that are multiples with each other, and thus at least partially overlap or collide in time. The UE 115-*a* may detect persistent paging message collisions (e.g., via subscription paging management software), and may enter a fallback state (e.g., a fallback mode). In the fallback mode, the UE 115-*a* may prioritize RATs for cell reselection associated with the second subscription (e.g., the subscription associated with SIM card 215-*b*). That is, in the fallback state, RATs associated with DRX cycles that may result in decreased occurrence of paging message overlap may be prioritized during cell reselection (e.g., GSM may be prioritized in the case the first subscription, which may be a non-DDS, uses LTE). As such, subscriptions may utilize RATs with DRX cycles that align less frequently or, in some cases, not at all. Therefore, paging messages 210 associated with both subscriptions may be received by UE 115-*a* with improved efficiency, as paging messages may not overlap (e.g., may not arrive while one of the subscriptions is in a standby state due to DSDS UE 115-*a* operation).

In some cases, shorter DRX cycles may also be employed to increase the number of paging opportunities, and thus one or more of the subscriptions may page the dual SIM UE 115 more often. In such cases, should a paging message associated with a subscription be missed (e.g., due to overlap with paging messages from the other subscription), the time until the next paging opportunity may be reduced, reducing system latency. For example, a DRX cycle may be reduced from 1.28 s to 640 ms. In some cases, utilization of shorter DRX cycles may be referred to as operation in a DRX reduction mode or utilization of DRX reduction techniques.

As discussed above, RAT priority associated with one or more of the at least two subscriptions may be changed or updated. Paging message overlap between paging messages of two or more subscriptions may be a function of the RAT employed by each subscription. That is, different operators of subscriptions that utilize the same RAT may schedule paging messages or configure the dual SIM UE 115 wakeup cycle in units particular to the RAT of operation (e.g., multiples of 320 ms), thus increasing the likelihood of recurrent paging message overlap associated with two or more subscriptions utilizing the same RAT (e.g., paging cycles for different subscriptions may be multiples of each other). Therefore, once a persistent collision condition is detected (e.g., via identifying multiple paging collision occurrences within a given time window), the RAT priority associated with at least one of the subscriptions may be updated. When coverage expires and a persistent collision condition is identified, the UE 115-*a* may use RAT priority to select one of the identified cells during cell reselection procedures.

For example, RATs that have paging cycles configured to different intervals in time may be prioritized over RATs with paging cycles that are similar to the RAT used during identification of persistent paging collisions. That is, during cell reselection, UE 115-*a* may prioritize RATs (e.g., GSM) to be used for SIM card 215-*b* that are associated with wakeup cycles that are offset from RATs used for SIM card 215-*a* (e.g., LTE), thus reducing occurrences of paging message overlap between the two subscriptions. Therefore, when UE 115-*a* camps on a GSM cell for paging messages associated with the subscription for SIM card 215-*b* and a LTE cell for paging messages associated with the subscription for SIM card 215-*a*, the paging messages may be monitored according to different paging intervals or DRX cycles that may be associated with fewer occurrences of overlap in time (e.g., as they are not associated with integer multiples of each other). As such, dual SIM UE 115-*a* may more effectively monitor paging using a single receiver.

In some cases, one subscription may be prioritized over other subscriptions in dual SIM UEs 115. For example, a subscription associated with SIM card 215-*a* may be prioritized over the subscription associated with SIM card 215-*b*. In such cases, the secondary subscription (e.g., associated with SIM card 215-*b*) may reprioritize RATs after persistent paging collisions are detected. As an example, a subscription associated with SIM card 215-a may be a DDS subscription and a subscription associated with SIM card 215-b may be a non-DDS subscription. The DDS subscription may have a default RAT priority (e.g., LTE>WCDMA>GSM, etc.) and the non-DDS subscription may, when the UE 115-a operates in a fallback mode after persistent collision detection, have an updated RAT priority (e.g., GSM>LTE, etc.). The DDS subscription and the non-DDS subscription designation may be based on a static user configuration. The DDS subscription may dynamically or temporarily be switched for multimedia messaging service (MMS) reception and may not change the subscription where the fallback mode should be triggered. When the DDS subscription is changed by the user, the UE 115-a may reset the fallback state machine and apply the fallback mode evaluation on the newly configured non-DDS subscription (e.g., reset the fallback machine to prioritize RATs for the non-DDS subscription cell reselection procedures such that paging is optimized for the changed DDS subscription, as discussed herein).

Further, the UE 115-a may create or configure internal RAT priority (e.g., as a network may configure a different default priority based on RAT throughput, etc.) as discussed above. Such may be referred to as the UE 115-a entering a fallback mode. In some cases, the fallback mode may be exited according to, for example, expiration of a timer (e.g., the UE 115-a may assume previous network configured RAT priority after expiration of a predetermined timer), paging collisions on the fallback mode reprioritized RAT, changes to DRX cycles, etc.

Modification of RAT priority settings (e.g., to enter a fallback state) may include a communications manager or UE 115 overriding RAT priorities configured by the network (e.g., for a non-DDS subscription). For example, the network (e.g., network 205-b) may configure a subscription according to a RAT priority during a cell selection or reselection procedure. RATs such as GERAN, UTRAN, E-UTRAN, etc. may be given an integer ranking according to a priority. The UE 115 may override these priorities and assign RATs new rankings, thus modifying the RAT priority settings. In some cases, network configured RAT priority may be conveyed to the UE 115 via one or more system information blocks (SIBs). Therefore, for modified RAT priority settings for a fallback mode, the UE 115 may override priority information received in SIBs for various RATs (e.g., SIB5 for LTE, SIB6 for UMTS, SIB7 for GSM, etc.). As another example, if a non-DDS subscription supports LTE and the UE 115 camps on LTE in the fallback mode, the UE 115 may make GSM the highest priority RAT (for a fallback mode) for cell reselection by overriding the network configured system information for the subscription for that RAT.

Paging block rate (PBR) calculation techniques may be used to determine persistent paging collision conditions that trigger fallback mode operation. PBR may refer to the occurrence or rate at which paging transmissions are blocked or overlap in time (e.g., paging transmissions associated with more than one subscription). For example, a communications manager may compute a PBR and compare the calculated PBR to target values and determine whether a persistent collision criteria is met for triggering of fallback mode operation. Further, PBR calculations may be computed assuming reduced or shortened DRX durations. PBR calculations assuming reduced or shortened DRX durations may be used to determine whether or not to employ DRX reduction techniques (e.g., enter a state associated with short DRX duration). PBR may further be determined for operation of different RATs. Such PBR calculations may be used when modifying RAT priority settings (e.g., when determining how to structure or order fallback mode RAT priority) and when determining whether or not to implement DRX reduction techniques.

A UE 115 may identify other conditions for when to start evaluating for potential persistent collision criterion and potential triggering of RAT priority adjustments (e.g., triggering entrance to a fallback state). For example, if UE 115 is camping on a RAT combination (e.g., a combination of RATs used for the two subscriptions) where both RATs are idle during single receiver DSDS operation (e.g., and neither of the RATs camped on are GSM), the UE 115 may begin to monitor for potential persistent collision scenarios. Further, persistent collision may be detected on a subscription with a larger DRX cycle by comparing filtered denial metrics with a threshold (e.g., a DRX reduction threshold). For example, $$\% \text{ Denials} = \frac{f_{denials}(n)}{f_{wakeups}(n)} * 100 > default_{threshold}$$

In some cases, the denial metric filtering may be performed for certain DRX cycles (e.g., LTE DRX cycles). In such cases, a communications manager may extend the denial metric filtering to any non-GSM technology. The communications manager may run denial metric filtering for the RAT with the larger DRX cycle in the case where the larger DRX cycle is an integer multiple of the smaller DRX cycle.

The communications manager may bypass evaluating if the DRX reduction feature may be enabled to meet the PBR block rate target. It may trigger fallback mode (e.g., GSM may be prioritized for a second subscription) after persistent collision conditions are detected. Some RATs (e.g., GSM and WCDMA may always use self-generated system information for RAT priority-based reselection in the fallback mode (e.g., regardless of whether or not the network has sent priority reselection system information or not). In some cases, a time hysteresis in resetting the fallback state machine may be employed (e.g. after entering a fallback state and/or a DDS switch flag is set) to reduce potential ping-pong reselection scenarios between GSM and the least-priority RAT if multimedia message (MMS) reception occurs frequently. That is, the UE 115 may wait a duration (e.g., 1 to 2 minutes) before resetting the fallback state machine.

When a UE 115 enters a fallback mode where some RAT is preferred or prioritized, the UE 115 may camp on a RAT with a different DRX cycle or pattern on the non-DDS subscription. For example, if a UE 115 enters a LTE preferred mode, the UE 115 may camp on GSM, WCDMA, or LTE on the non-DDS subscription. The camping RAT may perform procedures to ensure the UE 115 camps on LTE as much as LTE coverage allows. This may be achieved by using self-generated system information for priority-based reselection or overriding the priority-based reselection SIBs configured by the network. In cases where UE 115 overrides the priority-based reselection SIBs configured by the network, the UE 115 may store original copies of the system information (e.g., conveyed by the SIBs) for use when exiting the fallback mode.

Figure 3:
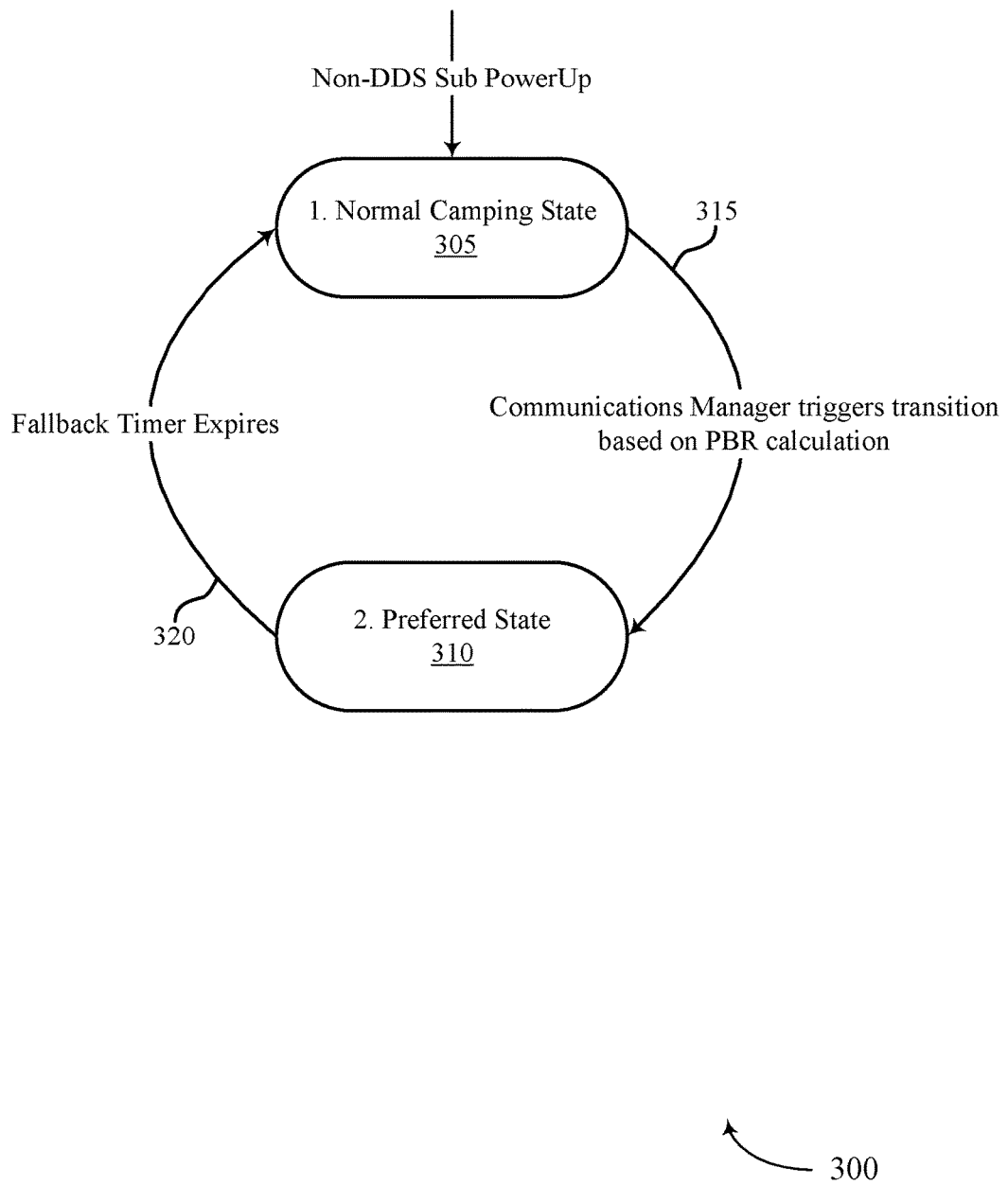
FIGS. 3 through 6 illustrate examples of state diagrams that support techniques for mitigating page collisions in dual SIM devices in accordance with aspects of the present disclosure.

FIG. 3 illustrates an example of a state diagram 300 that supports techniques for mitigating page collisions in dual SIM devices in accordance with various aspects of the present disclosure. In some examples, state diagram 300 may implement aspects of wireless communications system 100. A UE 115, as described with respect to FIGS. 1 and 2, may enter and exit a fallback mode based on transitions from a normal camping state to a fallback state, and vice versa, as illustrated by the state diagram 300. That is, state diagram 300 may include examples of a normal camping state 305, a fallback state 310, a fallback mode transition 315, and a normal mode transition 320. In some cases, state diagram 300 may be referred to as a fallback state machine.

In some cases, state diagram 300 may illustrate how a UE 115 may manage a fallback mode, according to techniques described herein. A normal camping state 305 may refer to a normal state or mode of UE 115 operation (e.g., an operational state after a UE 115 powers on, a DDS operational state, etc.). The UE 115 may operate using a primary subscription (e.g., for data and voice service) while operating in a normal camping state 305. Further, the normal camping state 305 may be associated with a preconfigured or default RAT priority for cell reselection, for example as assigned by the network using one or more SIBS. Fallback state 310 may refer to an operational state where the RAT priority is updated or altered (e.g., for cell reselection procedures associated with the second subscription), according to techniques described herein. That is, normal camping state 305 may be associated with a normal RAT priority (e.g., a default RAT priority as configured by a network) during cell reselection procedures, while fallback state 310 may be associated with a RAT priority updated for identified persistent paging collision scenarios. Further, a UE 115 operating in fallback state 310 may refer to a UE 115 operating in a fallback mode. As an example, a UE 115 operating in a normal camping state 305 may have a cell reselection RAT priority in the order of LTE>WCDMA>GSM, etc. and a UE 115 operating in a fallback state 310 may have a cell reselection RAT priority in the order of GSM>LTE>WCDMA, etc.

Therefore, when a dual SIM UE 115 detects a persistent paging collision condition (e.g., via software that manages paging for both subscriptions), the UE 115 may enter fallback state 310. In fallback state 310, the UE 115 may prioritize, for example, GSM over LTE during cell reselection procedures associated with a second subscription. Such prioritization may result in a paging cycle associated with a second subscription overlapping less with a paging cycle associated with a first subscription, as the subscriptions would be operated via RATs with different DRX cycles.

For example, when a non-DDS subscription powers up, the UE 115 may begin in a default camping state (e.g., normal camping state 305). The UE 115 may be in the normal camping state 305 during initial camping or upon exit from fallback state 310 (e.g., following a normal mode transition 320) upon expiration of a fallback timer. In the normal camping state 305, persistent collision scenarios may be monitored (e.g., to trigger a fallback mode transition 315) and conditions for entrance to fallback state 310 may be evaluated. When conditions are met such that the UE 115 enters fallback state 310, a fallback parameter may be set (e.g., to '1'), a least priority RAT parameter may not be 'null' and the fallback timer may begin running (e.g., expiration of the fallback timer may trigger a normal mode transition 320 back to normal camping state 305).

Figure 4:
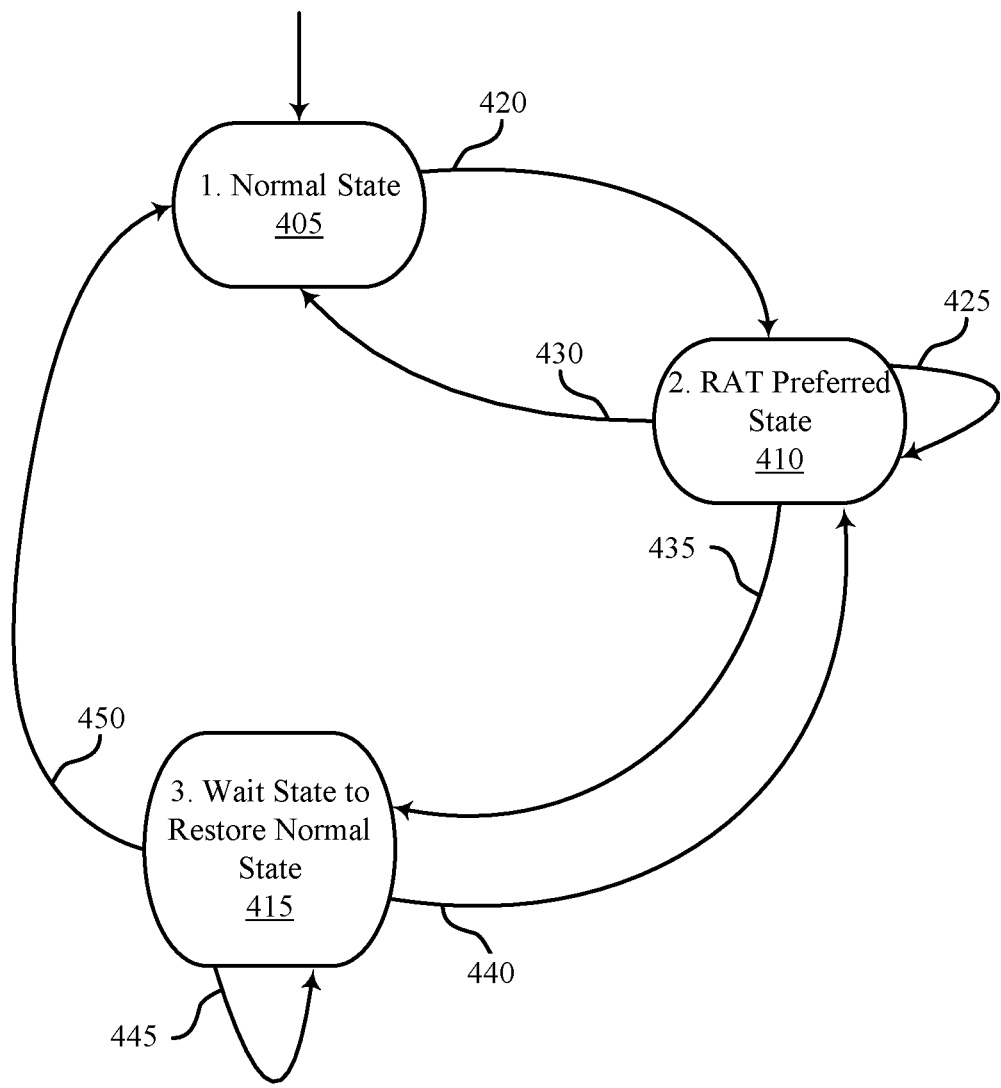

FIG. 4 illustrates an example of a state diagram 400 that supports techniques for mitigating page collisions in dual SIM devices in accordance with various aspects of the present disclosure. In some examples, state diagram 400 may implement aspects of wireless communications system 100. A UE 115, as described with respect to FIGS. 1 and 2, may enter and exit a fallback mode based on transitions from a normal camping state to a fallback state, and vice versa, as illustrated by the state diagram 400. That is, state diagram 400 may include examples of a normal camping state 405, a fallback state 410, a wait state 415, and various transitions between each of the states, as discussed in more detail below. In some cases, state diagram 400 may be referred to as a fallback state machine.

In some cases, state diagram 400 may illustrate how a UE 115 may manage a fallback mode, according to techniques described herein. A normal camping 405 may refer to a normal state or mode of UE 115 operation (e.g., an operational state after a UE 115 powers on, a DDS operational state, etc.). The UE 115 may operate using a primary subscription (e.g., for data and voice service) while operating in a normal camping 405. Further, the normal camping 405 may be associated with a preconfigured or default RAT priority for cell reselection. Fallback state 410 may refer to an operational state where the RAT priority is updated or altered (e.g., for cell reselection procedures associated with the second subscription), according to techniques described herein. That is, normal camping 405 may be associated with a normal RAT priority during cell reselection procedures, while fallback state 410 may be associated with a RAT priority updated for identified persistent paging collision scenarios. Further, a UE 115 operating in fallback state 410 may refer to a UE 115 operating in a fallback mode. As an example, a UE 115 operating in a normal camping 405 may have a cell reselection RAT priority in the order of LTE>WCDMA>GSM, etc. and a UE 115 operating in a fallback state 410 (RAT preferred state) may have a cell reselection RAT priority in the order of GSM>LTE>WCDMA, etc.

Therefore, when a dual SIM UE 115 detects a persistent paging collision condition (e.g., via software that manages paging for both subscriptions), the UE 115 may enter fallback state 410. In fallback state 410, the UE 115 may prioritize, for example, GSM over LTE during cell reselection procedures associated with a second subscription. Such prioritization may result in a paging cycle associated with a second subscription overlapping less with a paging cycle associated with a first subscription, as the subscriptions would be operated via RATs with different DRX cycles. Additionally, a UE 115 may operate in a wait state 415. A wait state 415 may be associated with the same RAT priority as the fallback state 410.

As an example, the normal camping state 405 may refer to a default state of operation the UE 115 operates in prior to entering a fallback state 410. The UE 115 may operate in a normal camping state 405 following a non-DDS subscription power up, a DDS subscription switch by the user interface, etc. In the normal camping state 405, the UE 115 may camp normally and follow default RAT priority (e.g., as configured by the network) during cell reselection or perform rank based cell reselection. When a fallback state 410 is triggered, a fallback timer may be started. Expiration of the fallback timer may result in a transition 430 back to the normal camping state 405. The fallback timer may run regardless of whether the UE 115 state is idle or not. The expiration of the fallback timer may be checked when the UE 115 is in the fallback state 410 (e.g., if the fallback timer expires when the UE 115 is in the wait state 415, the UE 115 may not return to the normal camping state 405 immediately, as the expiration of the fallback timer may not be checked in this state). The UE 115 may enter the wait state 415 when triggered by a set of conditions that may change the paging occasion allocation due to, for example, UE 115 mobility. A new timer may be used (e.g., a fallback wait exit timer) when the UE 115 operates in the wait state 415. For example, expiration of a fallback wait exit timer (e.g., set to 5 min), may trigger a transition 450, where the UE may transition from the wait state 415 to the normal camping state 405.

Transitions between the states described above are now discussed in more detail. Transition 420 may refer to a transition from normal camping state 405 to fallback state 410. As discussed above, transition 420 may be triggered when persistent collision criteria is met.

Transition 425 may refer to conditions for which the fallback state 410 is resumed (e.g., a transition to another state is not performed). For example, several conditions may result in resumption of the fallback state 410 when the UE 115 is already operating in the fallback state 410. Conditions for transition 425 may include a non-DDS subscription's active RAT not being a least prioritized RAT (e.g., according to the adjusted or modified RAT priority), a DDS subscription's active RAT has not changed, a DDS subscription DRX cycle has not changed, a non-DDS subscription least priority RAT DRX cycle has not changed, etc.

Transition 430 may refer to a transition from fallback state 410 to normal camping state 405. As discussed above, transition 430 may occur following expiration of a fallback timer.

Transition 435 may refer to a transition from fallback state 410 to wait state 415. Conditions for occurrence of transition 435 may include the non-DDS subscription lowest priority RAT (e.g., according to updated RAT priority) becoming active after entering the fallback state (e.g., where GSM coverage is poor), a DDS subscription DRX cycle change (e.g., that is not triggered by a communications manager), a DDS subscription RAT change, a non-DDS lowest priority RAT DRX cycle change, etc.

Transition 440 may refer to a transition from wait state 415 to fallback state 410. Conditions for occurrence of transition 440 may include persistent collision criteria again being satisfied while in the wait state (e.g., a UE 115 identifies a persistent collision scenario while operating in the wait state 415), a non-DDS active RAT change (e.g., from a non-GSM RAT to GSM), etc.

Transition 445 may refer to conditions for which the wait state 415 is resumed (e.g., a transition to another state is not performed). For example, several conditions may result in resumption of the wait state 415 when the UE 115 is already operating in the wait state 415. Conditions for transition 445 may include an active RAT combination changing and the non-DDS subscription active RAT is not, for example, GSM. In such cases, the fallback wait exit timer may be reset.

Transition 450 may refer to a transition from wait state 415 to normal camping state 405. As discussed, transition 450 may occur upon expiration of a fallback wait exit timer.

Figure 5:
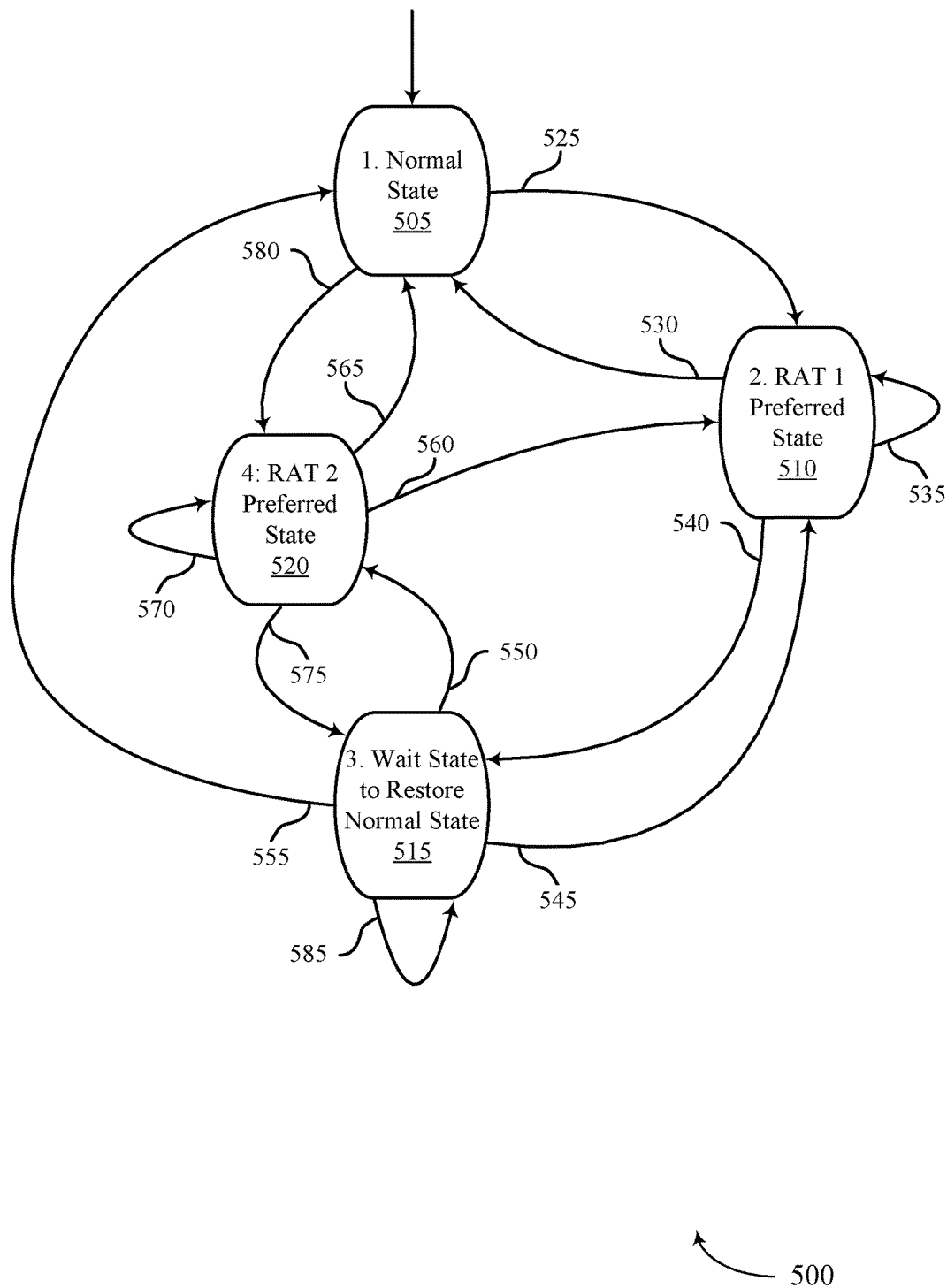

FIG. 5 illustrates an example of a state diagram 500 that supports techniques for mitigating page collisions in dual SIM devices in accordance with various aspects of the present disclosure. In some examples, state diagram 500 may implement aspects of wireless communications system 100. A UE 115, as described with respect to FIGS. 1 and 2, may enter and exit a fallback mode based on transitions from a normal camping state to a fallback state, and vice versa, as illustrated by the state diagram 500. That is, state diagram 500 may include examples of a normal camping state 505, a first fallback state 510, a wait state 515, a second fallback state 520, and various transitions between each of the states, as discussed in more detail below. In some examples, first fallback state 510 may differ from second fallback state 520 in that the RAT priority may be different. For example, first fallback state 510 may be associated with a GSM>WCDMA>LTE or GSM>LTE>WCDMA priority (e.g., the RAT 1 preferred state may be GSM), and second fallback state 520 may be associated with a LTE>GSM>WCDMA priority (e.g., the RAT 2 preferred state may be LTE). In some cases, state diagram 500 may be referred to as a fallback state machine.

In some cases, state diagram 500 may illustrate how a UE 115 may manage a fallback mode, according to techniques described herein. A normal camping 505 may refer to a normal state or mode of UE 115 operation (e.g., an operational state after a UE 115 powers on, a DDS operational state, etc.). The UE 115 may operate using a primary subscription (e.g., for data and voice service) while operating in a normal camping 505. Further, the normal camping 505 may be associated with a preconfigured or default RAT priority for cell reselection. First fallback state 510 and second fallback state 520 may refer to an operational state where the RAT priority is updated or altered (e.g., for cell reselection procedures associated with the second subscription), according to techniques described herein. That is, normal camping 505 may be associated with a normal RAT priority during cell reselection procedures, while first fallback state 510 and second fallback state 520 may be associated with a RAT priority updated for identified persistent paging collision scenarios. Further, a UE 115 operating in first fallback state 510 and second fallback state 520 may refer to a UE 115 operating in a fallback mode. As an example, a UE 115 operating in a normal camping 505 may have a cell reselection RAT priority in the order of LTE>WCDMA>GSM, etc. and a UE 115 operating in a fallback state may have a cell reselection RAT priority in the order of, for example, GSM>LTE>WCDMA, etc.

Therefore, when a dual SIM UE 115 detects a persistent paging collision condition (e.g., via software that manages paging for both subscriptions), the UE 115 may enter fallback state. In a fallback state, the UE 115 may prioritize, for example, GSM over LTE during cell reselection procedures associated with a second subscription. Such prioritization may result in a paging cycle associated with a second subscription overlapping less with a paging cycle associated with a first subscription, as the subscriptions would be operated via RATs with different DRX cycles. Additionally, a UE 115 may operate in a wait state 515. A wait state 515 may be associated with the same RAT priority as one of first fallback state 510 or second fallback state 520.

As an example, the normal camping state 505 may refer to a default state of operation the UE 115 operates in prior to entering a first fallback state 510. The UE 115 may operate in a normal camping state 505 following a non-DDS subscription powerup, a DDS subscription switch by the user interface, etc. In the normal camping state 505, the UE 115 may camp normally and follow default RAT priority (e.g., as configured by the network) during cell reselection or perform rank based cell reselection. When a first fallback state 510 is triggered, a fallback timer may be started, upon expiration of which may result in a transition 530 back to the normal camping state 505. The fallback timer may run regardless of whether the UE 115 state is idle or not. The expiration of the fallback timer may be checked when the UE 115 is in the first fallback state 510 (e.g., if the fallback timer expires when the UE 115 is in the wait state 515, the UE 115 may not return to the normal camping state 505 immediately, as the expiration of the fallback timer may not be checked in this state). The UE 115 may enter the wait state 515 when triggered by a set of conditions that may change the paging occasion allocation due to, for example, UE 115 mobility. A new timer may be used (e.g., a fallback wait exit timer) when the UE 115 operates in the wait state 515. For example, expiration of a fallback wait exit timer (e.g., set to 5 min), may trigger a transition 555, where the UE may transition from the wait state 515 to the normal camping state 505.

Transitions between the states described above are now discussed in more detail. Transition 525 may refer to a transition from normal camping state 505 to first fallback state 510. Transition 525 may be triggered when persistent collision criteria is met and a non-DDS subscription is operating via a RAT prone to paging collisions (e.g., LTE).

Transition 530 may refer to a transition from first fallback state 510 to normal camping state 505. As discussed above, transition 530 may occur following expiration of a fallback timer.

Transition 535 may refer to conditions for which the first fallback state 510 is resumed (e.g., a transition to another state is not performed). For example, several conditions may result in resumption of the first fallback state 510 when the UE 115 is already operating in the first fallback state 510. Conditions for transition 525 may include a non-DDS subscription's active RAT not being a least prioritized RAT (e.g., according to adjusted RAT priority), a DDS subscription's active RAT has not changed, a DDS subscription DRX cycle has not changed, a non-DDS subscription least priority RAT DRX cycle has not changed, etc.

Transition 540 may refer to a transition from first fallback state 510 to wait state 515. Conditions for occurrence of transition 540 may include the non-DDS subscription lowest priority RAT (e.g., according to updated RAT priority) becoming active after entering the fallback state (e.g., GSM coverage is poor), a DDS subscription DRS cycle change (e.g., that is not triggered by a communications manager), a DDS subscription RAT change, a non-DDS lowest priority RAT DRX cycle change, etc.

Transition 545 may refer to a transition from wait state 515 to first fallback state 510. Conditions for occurrence of transition 545 may include persistent collision criteria again being satisfied while in the wait state (e.g., a UE 115 identifies a persistent collision scenario while operating in the wait state 415) and a non-DDS subscription is operating via a RAT (e.g., LTE) prone to paging collisions, a non-DDS active RAT changes (e.g., from a non-GSM RAT to GSM) and the new RAT has a highest priority according to the RAT priority setting, etc.

Transition 550 may refer to a transition from wait state 515 to second fallback state 520. Conditions for occurrence of transition 550 may include persistent collision criteria again being satisfied while in the wait state (e.g., a UE 115 identifies a persistent collision scenario while operating in the wait state 415) and a non-DDS subscription is operating via a RAT prone to paging collisions (e.g., WCDMA), a non-DDS active RAT changes (e.g., from a non-GSM RAT to GSM) and the new RAT has a highest priority according to the RAT priority setting, etc. That is, in wait state 515, a UE 115 may transition to a first fallback state 510 or a second fallback state 520 depending on the priority of the RAT the non-DDS active RAT was changed to.

Transition 555 may refer to a transition from wait state 515 to normal camping state 505. As discussed, transition 555 may occur upon expiration of a fallback wait exit timer.

Transition 560 may refer to a transition from second fallback state 520 to first fallback state 510. Conditions for occurrence of transition 560 may include persistent collision criteria being met, and the non-DDS subscription being operated via LTE.

Transition 565 may refer to a transition from second fallback state 520 to normal camping state 505. As discussed above, transition 565 may occur following expiration of a fallback timer.

Transition 570 may refer to conditions for which the second fallback state 520 is resumed (e.g., a transition to another state is not performed). For example, several conditions may result in resumption of the second fallback state 520 when the UE 115 is already operating in the second fallback state 520. Conditions for transition 570 may include a non-DDS subscription's active RAT not being a least prioritized RAT (e.g., according to adjusted RAT priority), a DDS subscription's active RAT has not changed, a DDS subscription DRX cycle has not changed, a non-DDS subscription least priority RAT DRX cycle has not changed, etc.

Transition 575 may refer to a transition from second fallback state 520 to wait state 515. Conditions for occurrence of transition 575 may include the non-DDS subscription lowest priority RAT (e.g., according to updated RAT priority) becoming active after entering the fallback state (e.g., LTE coverage is poor), a DDS subscription DRS cycle change (e.g., that is not triggered by a communications manager), a DDS subscription RAT change, a non-DDS lowest priority RAT DRX cycle change, etc.

Transition 580 may refer to a transition from normal camping state 505 to second fallback state 520. Transition 580 may be triggered when persistent collision criteria is met and a non-DDS subscription is operating via a RAT prone to paging collisions (e.g., WCDMA).

Transition 585 may refer to conditions for which the wait state 515 is resumed (e.g., a transition to another state is not performed). For example, several conditions may result in resumption of the wait state 515 when the UE 115 is already operating in the wait state 515. Conditions for transition 585 may include an active RAT combination changing and the non-DDS subscription active RAT is not, for example, GSM. In such cases, the fallback wait exit timer may be reset.

Figure 6:
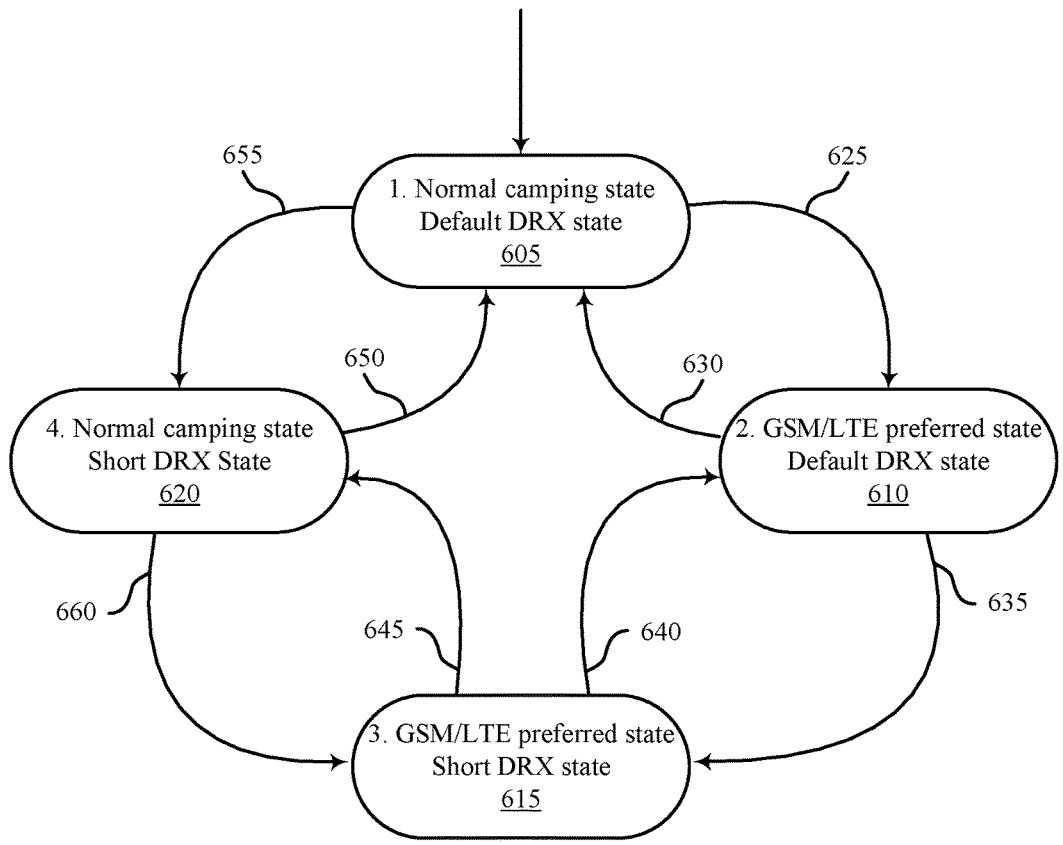

FIG. 6 illustrates an example of a state diagram 600 that supports techniques for mitigating page collisions in dual SIM devices in accordance with various aspects of the present disclosure. In some examples, state diagram 600 may implement aspects of wireless communications system 100. A UE 115, as described with respect to FIGS. 1 and 2, may enter and exit a fallback mode and employ DRX reduction features, as illustrated by the state diagram 600. That is, state diagram 600 may include examples of a default DRX normal camping state 605, a default DRX fallback state 610, a short DRX fallback state 615, a short DRX normal camping state 620, and various transitions between each of the states, as discussed in more detail below. In some cases, state diagram 600 may be referred to as a fallback state machine.

As discussed above with reference to FIG. 2, PBR calculations may be used to determine a persistent paging collision condition exists. Further, PBR calculations may be computed assuming reduced or shortened DRX durations. PBR calculations assuming reduced or shortened DRX durations may be used to determine whether or not to enter a state associated with short DRX duration (e.g., short DRX fallback state 615 or short DRX normal camping state 620). Alternatively, conditions for entering a state associated with short DRX duration may include poor coverage on RATs high on a modified RAT priority setting (e.g., GSM has poor coverage, so DRX reduction techniques are employed to reduce PBR on problematic RATs).

Default DRX normal camping state 605 may refer to the default camping state for a UE 115. A UE 115 may operate according to default DRX normal camping state 605 during initial camping or upon exit from default DRX fallback state 610 after expiration of a fallback timer while DRX reduction features are not enabled. While in default DRX normal camping state 605 persistent collision conditions may be detected. Thus, conditions for DRX reduction (e.g., transition 655 from default DRX normal camping state 605 to short DRX normal camping state 620) and conditions for exit from default DRX normal camping state 605 to default DRX fallback state 610 (e.g., PBR triggers fallback mode) may be evaluated. As shown in FIG. 6, either PBR fallback mode (e.g., transition 625) or DRX reduction mode (e.g., transition 655) may be triggered as a result of persistent collision detection.

Default DRX fallback state 610 may refer to a fallback state (e.g., associated with a UE 115 determined RAT priority setting, according to techniques described here) associated with default DRX durations. While in default DRX fallback state 610, a UE 115 may still monitor for conditions to potentially enter a short DRX fallback state 615 (e.g., monitor for conditions that may trigger transition 635). While in default DRX fallback state 610, expiration of a timer may result in transition back to default DRX normal camping state 605 (e.g., trigger transition 630).

Short DRX fallback state 615 may refer to a fallback state (e.g., associated with a UE 115 determined RAT priority setting, according to techniques described here) associated with shortened DRX durations. While in short DRX fallback state 615, expiration of a timer may result in transition to short DRX normal camping state 620 (e.g., trigger a transition 660).

Short DRX normal camping state 620 may refer to a normal camping state associated with shortened DRX durations (e.g., a normal camping state employing DRX reduction techniques). If PBR calculations trigger the UE 115 to enter a fallback mode while operating in short DRX normal camping state 620, transition 660 to short DRX fallback state 615 may be triggered. Further, if conditions are met, the UE may enter a default DRX normal camping state 605 (e.g., DRX reduction methods may be halted) via transition 650.

Figure 7:
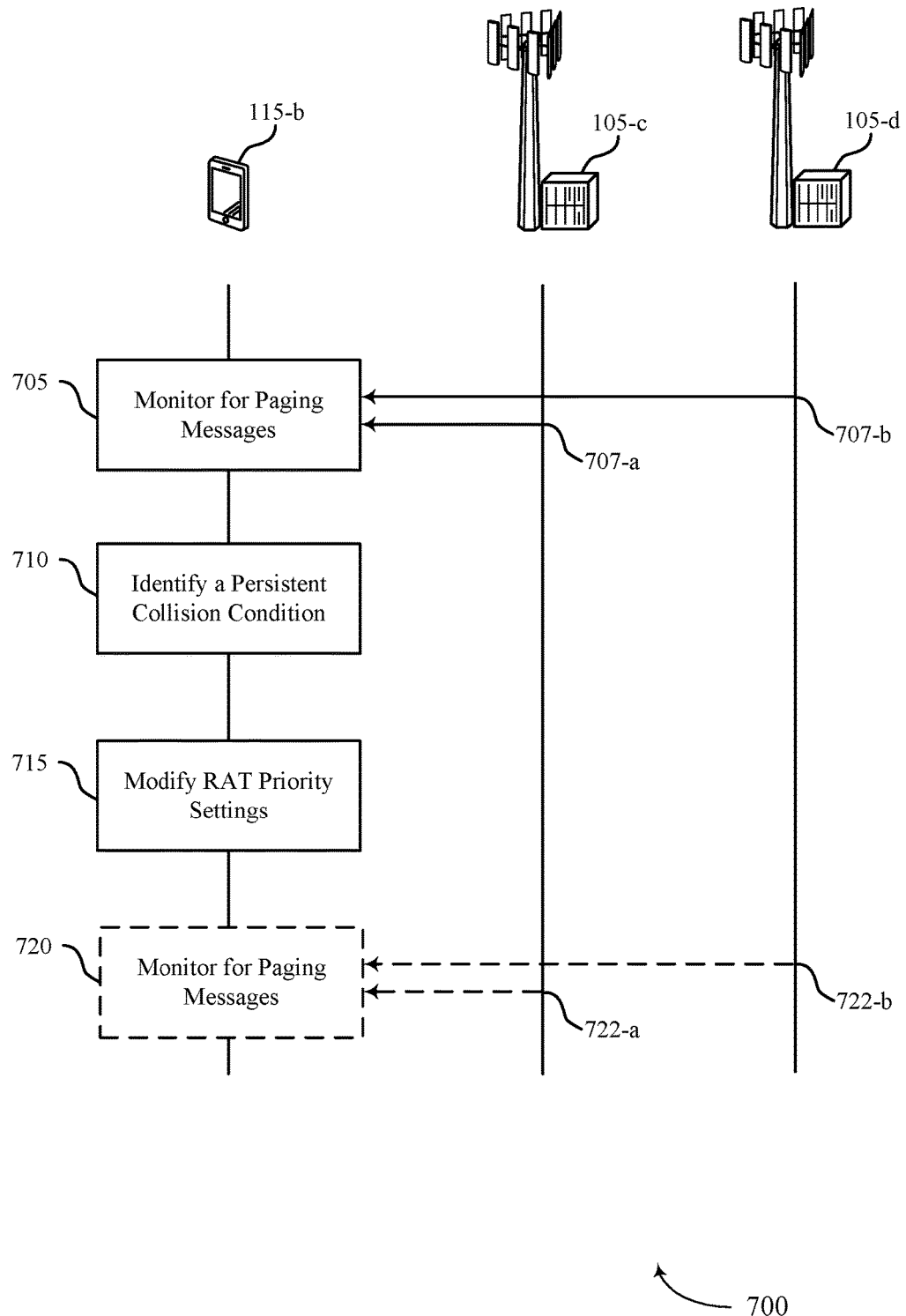
FIG. 7 illustrates an example of a process flow that supports techniques for mitigating page collisions in dual SIM devices in accordance with aspects of the present disclosure.

FIG. 7 illustrates an example of a process flow 700 that supports techniques for mitigating page collisions in dual SIM devices in accordance with various aspects of the present disclosure. In some examples, process flow 700 may implement aspects of wireless communications system 100. Process flow 700 may include a base station 105-c, a base station 105-d, and a UE 115-b, which may be examples of corresponding devices as described with reference to FIGS. 1 and 2. According to aspects of the present disclosure, base station 105-c and base station 105-d may be associated with different networks and may further communicate with UE 115-b (a dual SIM device) via different subscriptions.

At 705, UE 115-b may monitor for paging messages 707. For example, UE 115-b may monitor for first paging messages using a first RAT according to a first paging cycle for the first RAT, from a first network for a first SIM, and monitor for second paging messages using a second RAT, from a second network for a second SIM. In some cases, the first RAT and the second RAT may be the same, or may be RATs with similar DRX cycles.

In such cases, the paging messages 707 may occur at the same or overlapping times (e.g., collide in time). As such, UE 115-b may identify a persistent collision condition at 710. Persistent collision conditions such as the one identified at 710 may be identified based on PBR calculations and may be problematic due to DSDS operation where one subscription operates in a standby state, as discussed in more detail above.

At 715, UE 115-b may enter a fallback mode and modify RAT priority settings as described in the present disclosure. The UE 115-b may modify RAT priority settings due to the persistent collision condition identified at 710.

At 720, UE 115-b may operate in a fallback state and may monitor for paging messages 722. In some cases, during a cell reselection procedure, the UE 115-b may use the modified RAT priority settings for cell reselection, such that one of the subscriptions is now operated using a new RAT. In some examples, the new RAT may be associated with a DRX cycle that does not overlap with the DRX cycle used for the other supported subscription. Therefore, base station 105-c and base station 105-d may utilize different RATs and send paging messages according to different DRX cycles. As such, paging messages 722 may not overlap in time, and may be received by UE 115-b with increased efficiency.

Figure 8:
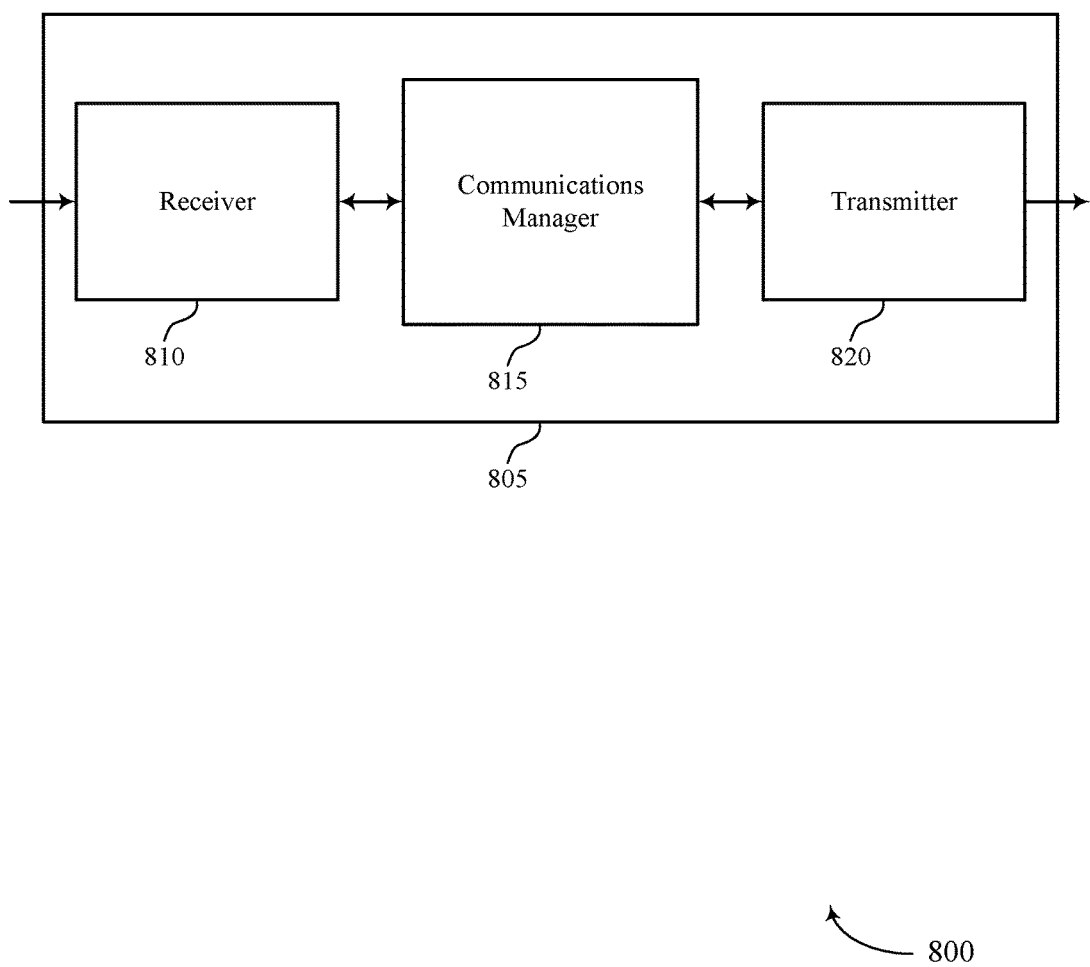
FIGS. 8 through 10 show block diagrams of a device that supports techniques for mitigating page collisions in dual SIM devices in accordance with aspects of the present disclosure.

FIG. 8 shows a block diagram 800 of a wireless device 805 that supports techniques for mitigating page collisions in dual subscriber identity module (SIM) devices in accordance with aspects of the present disclosure. Wireless device 805 may be an example of aspects of a UE 115 as described herein. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to techniques for mitigating page collisions in dual SIM devices, etc.). Information may be passed on to other components of the device. The receiver 810 may be an example of aspects of the transceiver 1135 described with reference to FIG. 11. The receiver 810 may utilize a single antenna or a set of antennas.

Communications manager 815 may be an example of aspects of the communications manager 1115 described with reference to FIG. 11. Communications manager 815 and/or at least some of its various sub-components may be implemented in hardware, software executed by a processor, firmware, or any combination thereof. If implemented in software executed by a processor, the functions of the communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 815 and/or at least some of its various sub-components may be physically located at various positions, including being distributed such that portions of functions are implemented at different physical locations by one or more physical devices. In some examples, communications manager 815 and/or at least some of its various sub-components may be a separate and distinct component in accordance with various aspects of the present disclosure. In other examples, communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 815 may monitor, using a first radio access technology (RAT) according to a first paging cycle for the first RAT, for first paging messages from a first network for a first subscriber identify module (SIM) of a UE, monitor for second paging messages from a second network for a second SIM of the UE, identify collisions in time between the monitored first paging messages and the monitored second paging messages, and modify a RAT priority setting for the first SIM to prioritize a second RAT over the first RAT based on the identified collisions.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
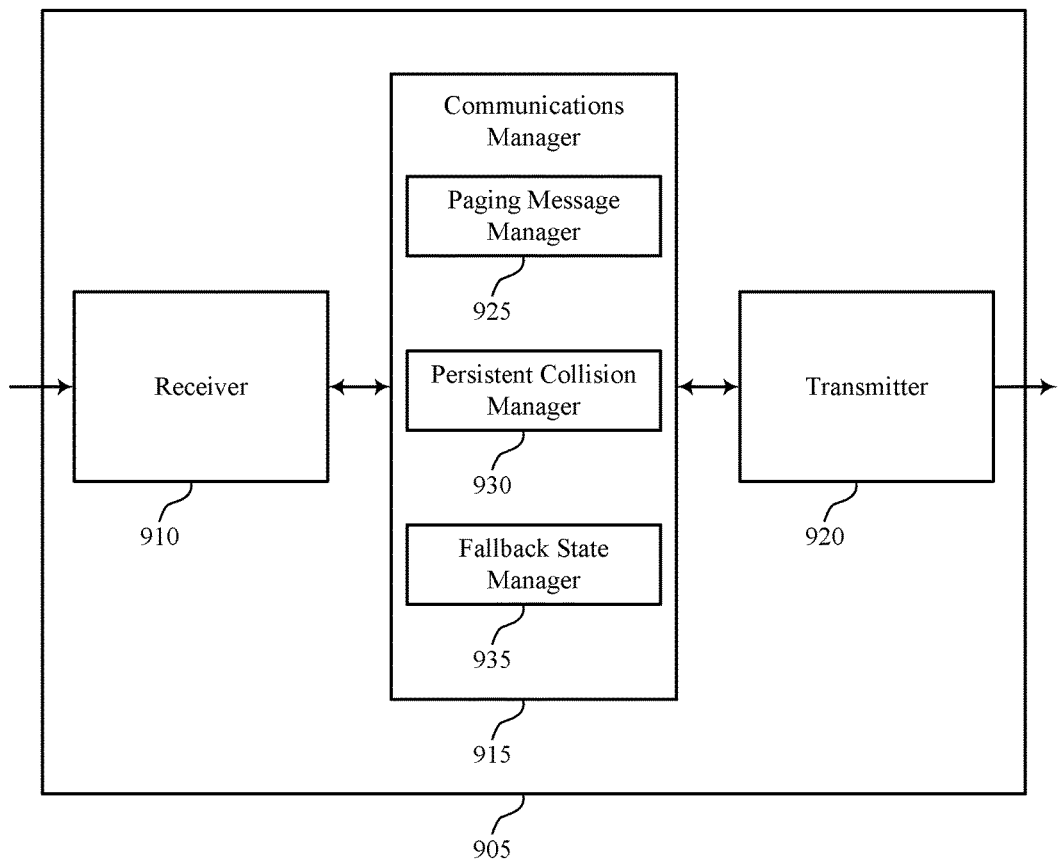

FIG. 9 shows a block diagram 900 of a wireless device 905 that supports techniques for mitigating page collisions in dual SIM devices in accordance with aspects of the present disclosure. Wireless device 905 may be an example of aspects of a wireless device 805 or a UE 115 as described with reference to FIG. 8. Wireless device 905 may include receiver 910, communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to techniques for mitigating page collisions in dual SIM devices, etc.). Information may be passed on to other components of the device. The receiver 910 may be an example of aspects of the transceiver 1135 described with reference to FIG. 11. The receiver 910 may utilize a single antenna or a set of antennas.

Communications manager 915 may be an example of aspects of the communications manager 1115 described with reference to FIG. 11. Communications manager 915 may also include paging message manager 925, persistent collision manager 930, and fallback state manager 935.

Paging message manager 925 may monitor, using a first RAT according to a first paging cycle for the first RAT, for first paging messages from a first network for a first SIM of a UE, receive paging messages from the first network for the first SIM using the second RAT based on the modified RAT priority setting, identify, while the timer is active, that the first SIM of the UE is using a third RAT, identify, while the timer is active, that the second RAT for the first SIM is active, identify, while the timer is active, that the first RAT for the first SIM has a highest priority of the RAT priority setting, and monitor for second paging messages from a second network for a second SIM of the UE. In some cases, monitoring for second paging messages includes monitoring, using a third RAT, for the second paging messages from the second network for the second SIM of the UE. In some cases, the first RAT is one of LTE, WCDMA, GSM, and 5G wireless technology. In some cases, the second RAT is one of LTE, WCDMA, GSM, and 5G wireless technology, where the first RAT is different from the second RAT. In some cases, monitoring for the second paging messages includes: monitoring for the second paging messages from the second network for the second SIM of the UE using the first RAT. In some cases, the first SIM is a voice subscription and the second SIM is a dedicated data subscription or the first SIM is the dedicated data subscription and the second SIM is the voice subscription. In some cases, the UE monitors for the first paging messages from the first network for the first SIM and the second paging messages from the second network for the second SIM using a single radio of the UE.

Persistent collision manager 930 may identify collisions in time between the monitored first paging messages and the monitored second paging messages and identify, while the timer is active, further collisions between the monitored first paging messages and the monitored second paging messages. In some cases, identifying collisions between the monitored first paging messages and the monitored second paging messages includes: identifying that a paging block rate for the monitored first paging messages, or the monitored second paging messages, or a combination thereof, exceeds a predetermined threshold.

Fallback state manager 935 may modify a RAT priority setting for the first SIM to prioritize a second RAT over the first RAT based on the identified collisions, perform a cell selection procedure with the first network for the first SIM based on removing the first RAT from the RAT capability list, maintain the modified RAT priority setting for the first SIM to prioritize the second RAT over the first RAT based on the identified further collisions, maintain the modified RAT priority setting for the first SIM to prioritize the second RAT over the first RAT based on the identification that the second RAT is active for the first SIM, restore, upon expiration of the timer, the RAT priority setting for the first SIM to prioritize the first RAT over the second RAT, modify the RAT priority setting for the first SIM to prioritize the first RAT over the second RAT and the third RAT based on the identified collisions and the identification that the first SIM is using the third RAT while the timer is active, perform a reselection procedure with the first network using the second RAT based on the modified RAT priority setting, receive one or more system information blocks for the first SIM that indicate priority settings for the first RAT and the second RAT, where modifying the RAT priority setting for the first SIM includes overriding the indicated priority setting for the first RAT, or the indicated priority setting for the second RAT, or a combination thereof, modify a RAT priority setting for the second SIM to prioritize a fourth RAT over the third RAT based on the identified conditions, and modify the RAT priority setting for the first SIM to prioritize the first RAT over the second RAT and a third RAT based on the identification that the second RAT is active for the first SIM and the identification that the first SIM is using the third RAT while the timer is active. In some cases, the received one or more system information blocks include: a system information block for reselection to an evolved universal terrestrial radio access (E-UTRA) cell, a system information block for reselection to a universal terrestrial radio access network (UTRAN) cell, a system information block for reselection to a global system for mobile communication (GSM) enhanced data rates for GSM evolution (EDGE) radio access network (GERAN) cell, or some combination thereof. In some cases, modifying the RAT priority setting for the first SIM to prioritize the second RAT over the first RAT includes: removing the first RAT from a RAT capability list based on the identified collisions.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
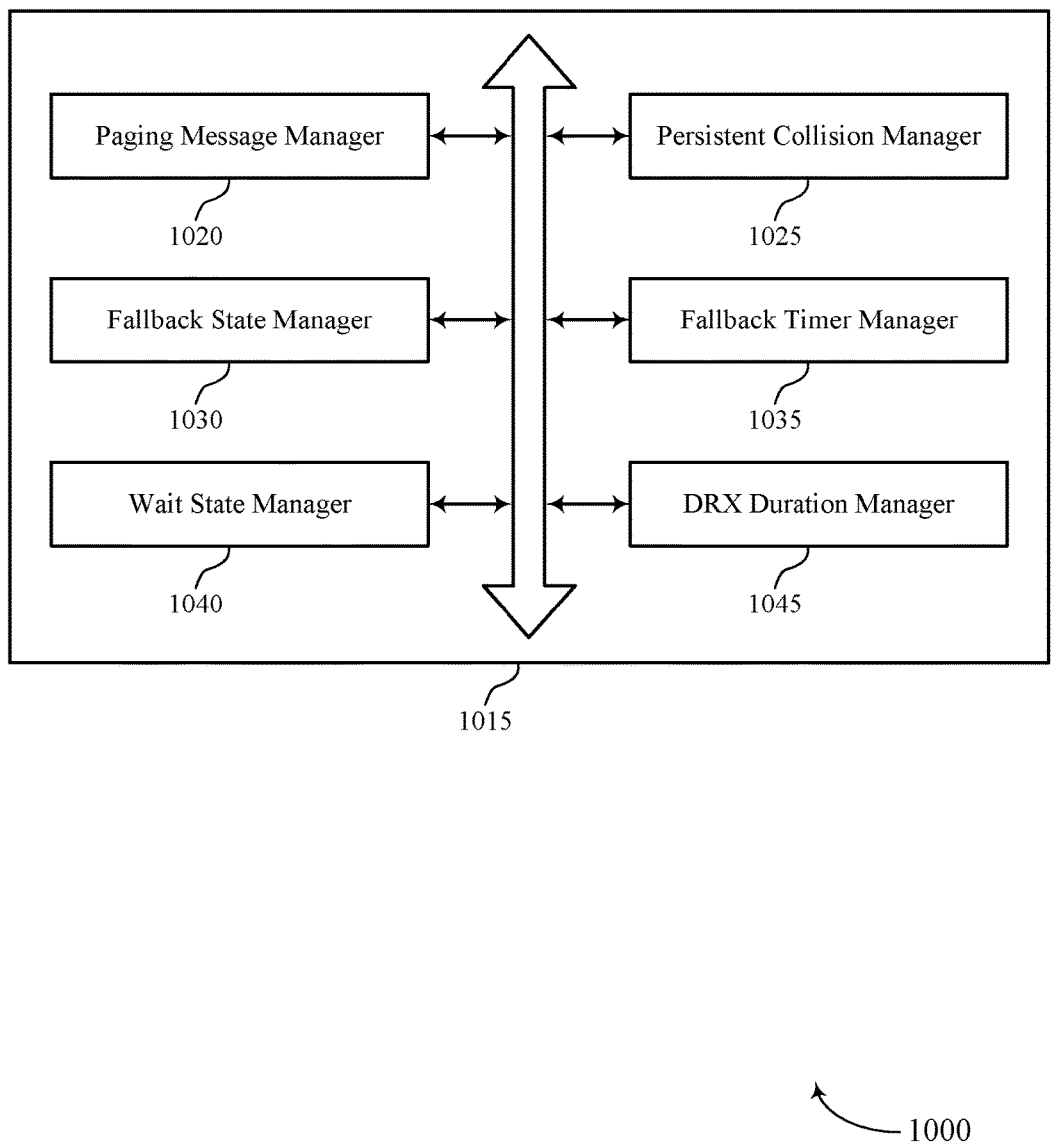

FIG. 10 shows a block diagram 1000 of a communications manager 1015 that supports techniques for mitigating page collisions in dual SIM devices in accordance with aspects of the present disclosure. The communications manager 1015 may be an example of aspects of a communications manager 815, a communications manager 915, or a communications manager 1115 described with reference to FIGS. 8, 9, and 11. The communications manager 1015 may include paging message manager 1020, persistent collision manager 1025, fallback state manager 1030, fallback timer manager 1035, wait state manager 1040, and DRX duration manager 1045. Each of these modules may communicate, directly or indirectly, with one another (e.g., via one or more buses).

Paging message manager 1020 may monitor, using a first RAT according to a first paging cycle for the first RAT, for first paging messages from a first network for a first subscriber identify module (SIM) of a UE, receive paging messages from the first network for the first SIM using the second RAT based on the modified RAT priority setting, identify, while the timer is active, that the first SIM of the UE is using a third RAT, identify, while the timer is active, that the second RAT for the first SIM is active, identify, while the timer is active, that the first RAT for the first SIM has a highest priority of the RAT priority setting, and monitor for second paging messages from a second network for a second SIM of the UE. In some cases, monitoring for second paging messages includes: monitoring, using a third RAT, for the second paging messages from the second network for the second SIM of the UE. In some cases, the first RAT is one of LTE, WCDMA, GSM, and 5G wireless technology. In some cases, the second RAT is one of LTE, WCDMA, GSM, and 5G wireless technology, where the first RAT is different from the second RAT. In some cases, monitoring for the second paging messages includes: monitoring for the second paging messages from the second network for the second SIM of the UE using the first RAT. In some cases, the first SIM is a voice subscription and the second SIM is a dedicated data subscription or the first SIM is the dedicated data subscription and the second SIM is the voice subscription. In some cases, the UE monitors for the first paging messages from the first network for the first SIM and the second paging messages from the second network for the second SIM using a single radio of the UE.

Persistent collision manager 1025 may identify collisions in time between the monitored first paging messages and the monitored second paging messages and identify, while the timer is active, further collisions between the monitored first paging messages and the monitored second paging messages. In some cases, identifying collisions between the monitored first paging messages and the monitored second paging messages includes: identifying that a paging block rate for the monitored first paging messages, or the monitored second paging messages, or a combination thereof, exceeds a predetermined threshold.

Fallback state manager 1030 may modify a RAT priority setting for the first SIM to prioritize a second RAT over the first RAT based on the identified collisions, perform a cell selection procedure with the first network for the first SIM based on removing the first RAT from the RAT capability list, maintain the modified RAT priority setting for the first SIM to prioritize the second RAT over the first RAT based on the identified further collisions, maintain the modified RAT priority setting for the first SIM to prioritize the second RAT over the first RAT based on the identification that the second RAT is active for the first SIM, restore, upon expiration of the timer, the RAT priority setting for the first SIM to prioritize the first RAT over the second RAT, modify the RAT priority setting for the first SIM to prioritize the first RAT over the second RAT and the third RAT based on the identified collisions and the identification that the first SIM is using the third RAT while the timer is active, perform a reselection procedure with the first network using the second RAT based on the modified RAT priority setting, receive one or more system information blocks for the first SIM that indicate priority settings for the first RAT and the second RAT, where modifying the RAT priority setting for the first SIM includes overriding the indicated priority setting for the first RAT, or the indicated priority setting for the second RAT, or a combination thereof, modify a RAT priority setting for the second SIM to prioritize a fourth RAT over the third RAT based on the identified conditions, and modify the RAT priority setting for the first SIM to prioritize the first RAT over the second RAT and a third RAT based on the identification that the second RAT is active for the first SIM and the identification that the first SIM is using the third RAT while the timer is active. In some cases, the received one or more system information blocks include: a system information block for reselection to an E-UTRA cell, a system information block for reselection to a UTRAN cell, a system information block for reselection to a GSM enhanced data rates for GSM evolution (EDGE) radio access network (GERAN) cell, or some combination thereof. In some cases, modifying the RAT priority setting for the first SIM to prioritize the second RAT over the first RAT includes: removing the first RAT from a RAT capability list based on the identified collisions.

Fallback timer manager 1035 may start a timer based on the modified RAT priority setting.

Wait state manager 1040 may identify a change in a mobility condition of the UE, start a timer for the UE to remain in a wait state based on the identified change, identify, while the timer is active, further collisions between the monitored first paging messages and the monitored second paging messages, and identify, while the timer is active, that the second RAT for the first SIM is active. In some cases, the change in the mobility condition of the UE includes the first RAT or a third RAT is active for the first SIM, a discontinuous reception cycle for the second SIM change, a RAT used by the second SIM change, a discontinuous reception cycle for the first RAT or a third RAT for the first SIM change, or some combination thereof.

DRX duration manager 1045 may reduce a discontinuous reception period for the first SIM based on the identified collisions and receive, from the first network, an assignment of the reduced discontinuous reception period for the first SIM. In some cases, reducing the discontinuous reception period based on the identified collisions includes: transmitting, to the first network, a request for a reduced discontinuous reception period for the first SIM based on the identified collisions.

Figure 11:
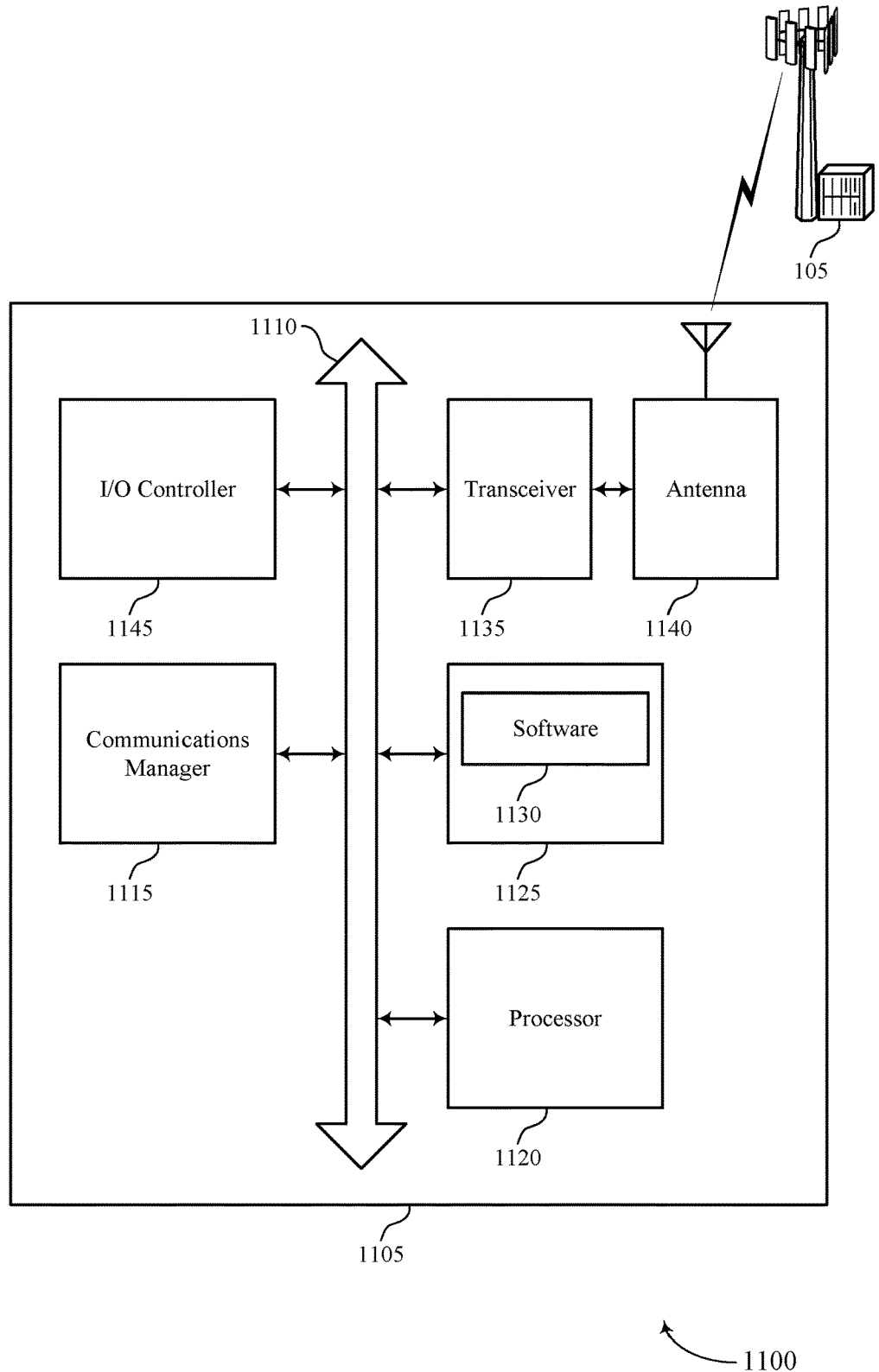
FIG. 11 illustrates a block diagram of a system including a user equipment (UE) that supports techniques for mitigating page collisions in dual SIM devices in accordance with aspects of the present disclosure.

FIG. 11 shows a diagram of a system 1100 including a device 1105 that supports techniques for mitigating page collisions in dual SIM devices in accordance with aspects of the present disclosure. Device 1105 may be an example of or include the components of wireless device 805, wireless device 905, or a UE 115 as described above, e.g., with reference to FIGS. 8 and 9. Device 1105 may include components for bi-directional voice and data communications including components for transmitting and receiving communications, including communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting techniques for mitigating page collisions in dual SIM devices).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support techniques for mitigating page collisions in dual SIM devices. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
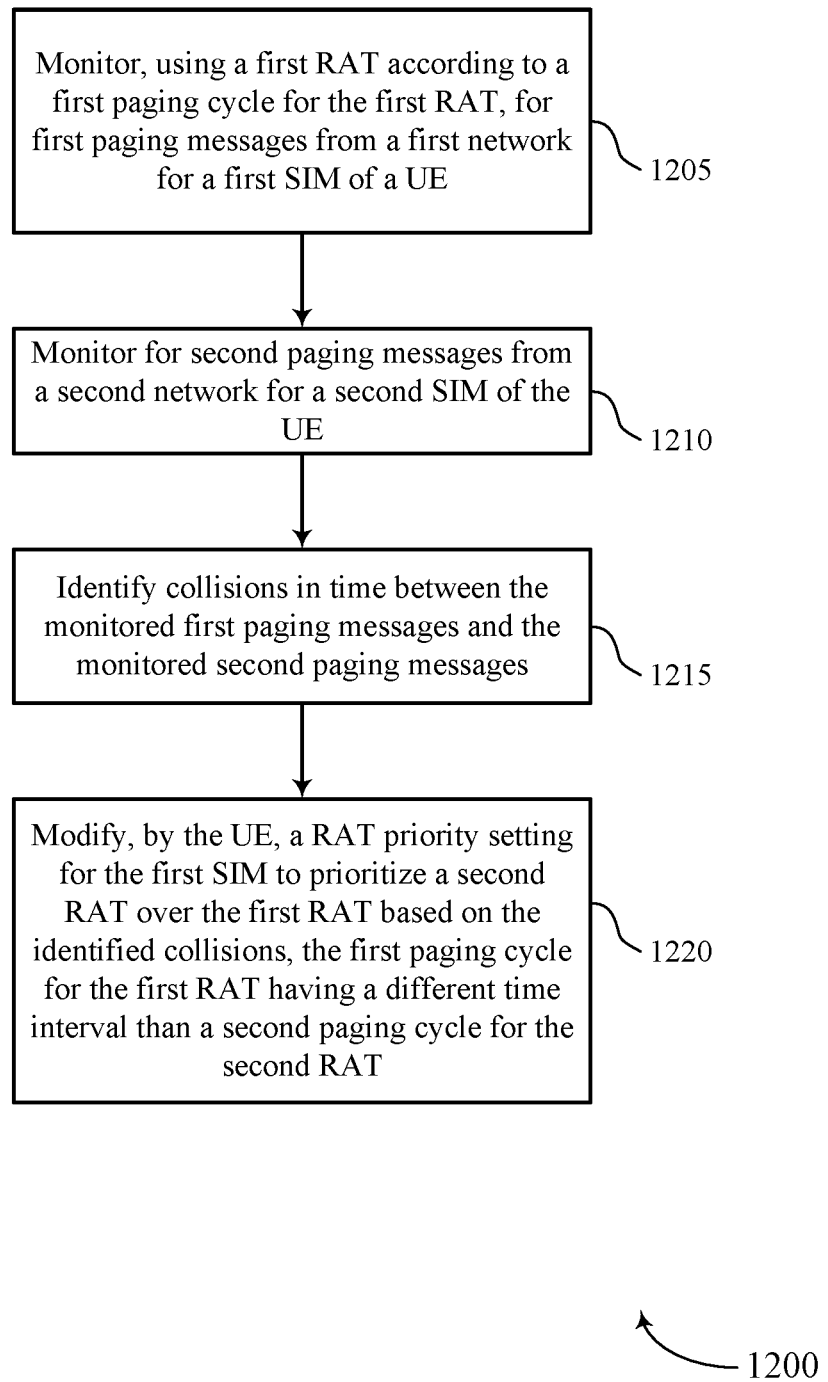
FIGS. 12 through 15 illustrate methods for techniques for mitigating page collisions in dual SIM devices in accordance with aspects of the present disclosure.

FIG. 12 shows a flowchart illustrating a method 1200 for techniques for mitigating page collisions in dual SIM devices in accordance with aspects of the present disclosure. The operations of method 1200 may be implemented by a UE 115 or its components as described herein. For example, the operations of method 1200 may be performed by a communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may monitor, using a first RAT according to a first paging cycle for the first RAT, for first paging messages from a first network for a first SIM of a UE. The operations of block 1205 may be performed according to the methods described herein. In certain examples, aspects of the operations of block 1205 may be performed by a paging message manager as described with reference to FIGS. 8 through 11.

At block 1210 the UE 115 may monitor for second paging messages from a second network for a second SIM of the UE. The operations of block 1210 may be performed according to the methods described herein. In certain examples, aspects of the operations of block 1210 may be performed by a paging message manager as described with reference to FIGS. 8 through 11.

At block 1215 the UE 115 may identify collisions in time between the monitored first paging messages and the monitored second paging messages. The operations of block 1215 may be performed according to the methods described herein. In certain examples, aspects of the operations of block 1215 may be performed by a persistent collision manager as described with reference to FIGS. 8 through 11.

At block 1220 the UE 115 may modify a RAT priority setting for the first SIM to prioritize a second RAT over the first RAT based at least in part on the identified collisions, the first paging cycle for the first RAT having a different time interval than a second paging cycle for the second RAT. The operations of block 1220 may be performed according to the methods described herein. In certain examples, aspects of the operations of block 1220 may be performed by a fallback state manager as described with reference to FIGS. 8 through 11.

Figure 13:
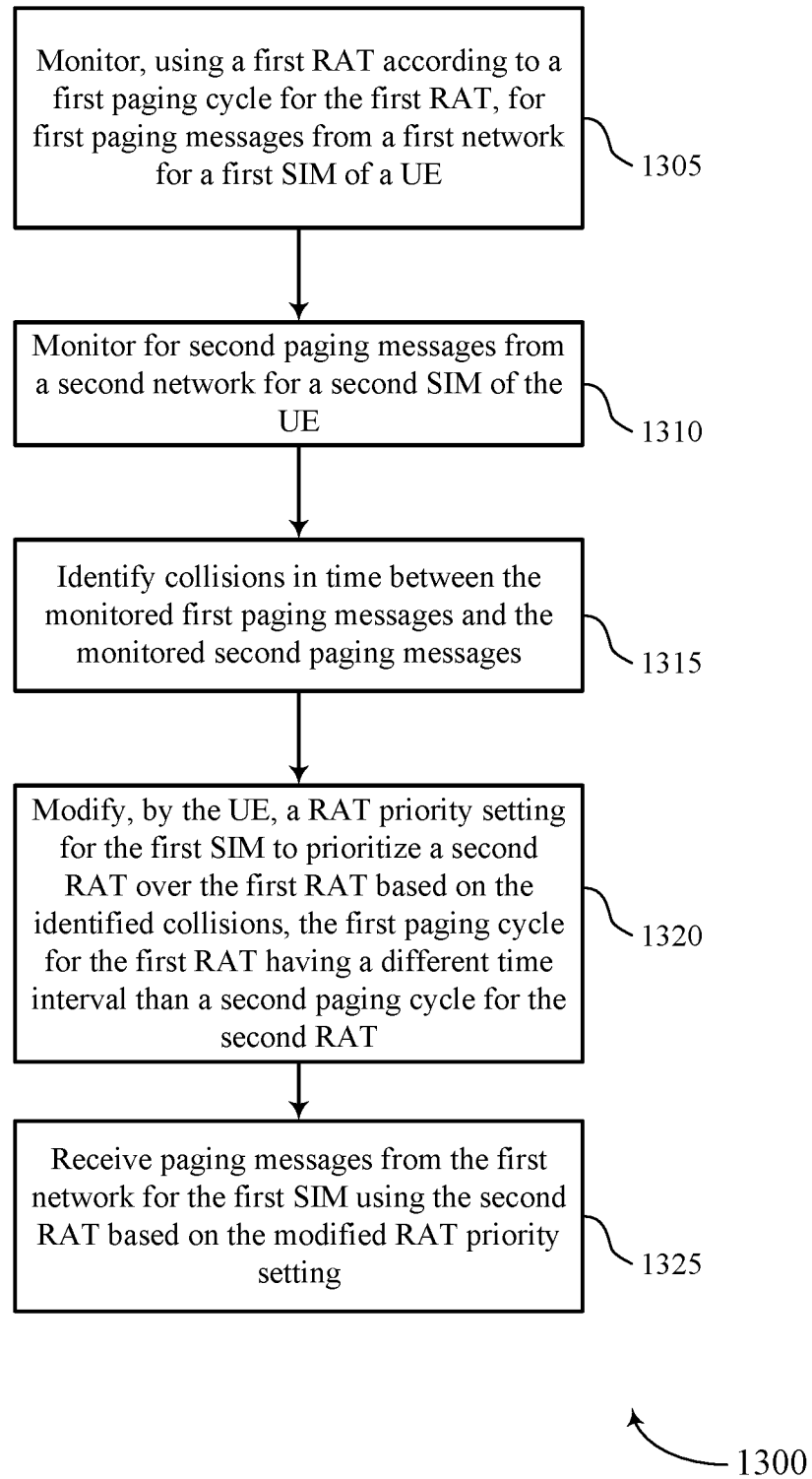

FIG. 13 shows a flowchart illustrating a method 1300 for techniques for mitigating page collisions in dual SIM devices in accordance with aspects of the present disclosure. The operations of method 1300 may be implemented by a UE 115 or its components as described herein. For example, the operations of method 1300 may be performed by a communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may monitor, using a first RAT according to a first paging cycle for the first RAT, for first paging messages from a first network for a first SIM of a UE. The operations of block 1305 may be performed according to the methods described herein. In certain examples, aspects of the operations of block 1305 may be performed by a paging message manager as described with reference to FIGS. 8 through 11.

At block 1310 the UE 115 may monitor for second paging messages from a second network for a second SIM of the UE. The operations of block 1310 may be performed according to the methods described herein. In certain examples, aspects of the operations of block 1310 may be performed by a paging message manager as described with reference to FIGS. 8 through 11.

At block 1315 the UE 115 may identify collisions in time between the monitored first paging messages and the monitored second paging messages. The operations of block 1315 may be performed according to the methods described herein. In certain examples, aspects of the operations of block 1315 may be performed by a persistent collision manager as described with reference to FIGS. 8 through 11.

At block 1320 the UE 115 may modify a RAT priority setting for the first SIM to prioritize a second RAT over the first RAT based at least in part on the identified collisions, the first paging cycle for the first RAT having a different time interval than a second paging cycle for the second RAT. The operations of block 1320 may be performed according to the methods described herein. In certain examples, aspects of the operations of block 1320 may be performed by a fallback state manager as described with reference to FIGS. 8 through 11.

At block 1325 the UE 115 may receive paging messages from the first network for the first SIM using the second RAT based at least in part on the modified RAT priority setting. The operations of block 1325 may be performed according to the methods described herein. In certain examples, aspects of the operations of block 1325 may be performed by a paging message manager as described with reference to FIGS. 8 through 11.

Figure 14:
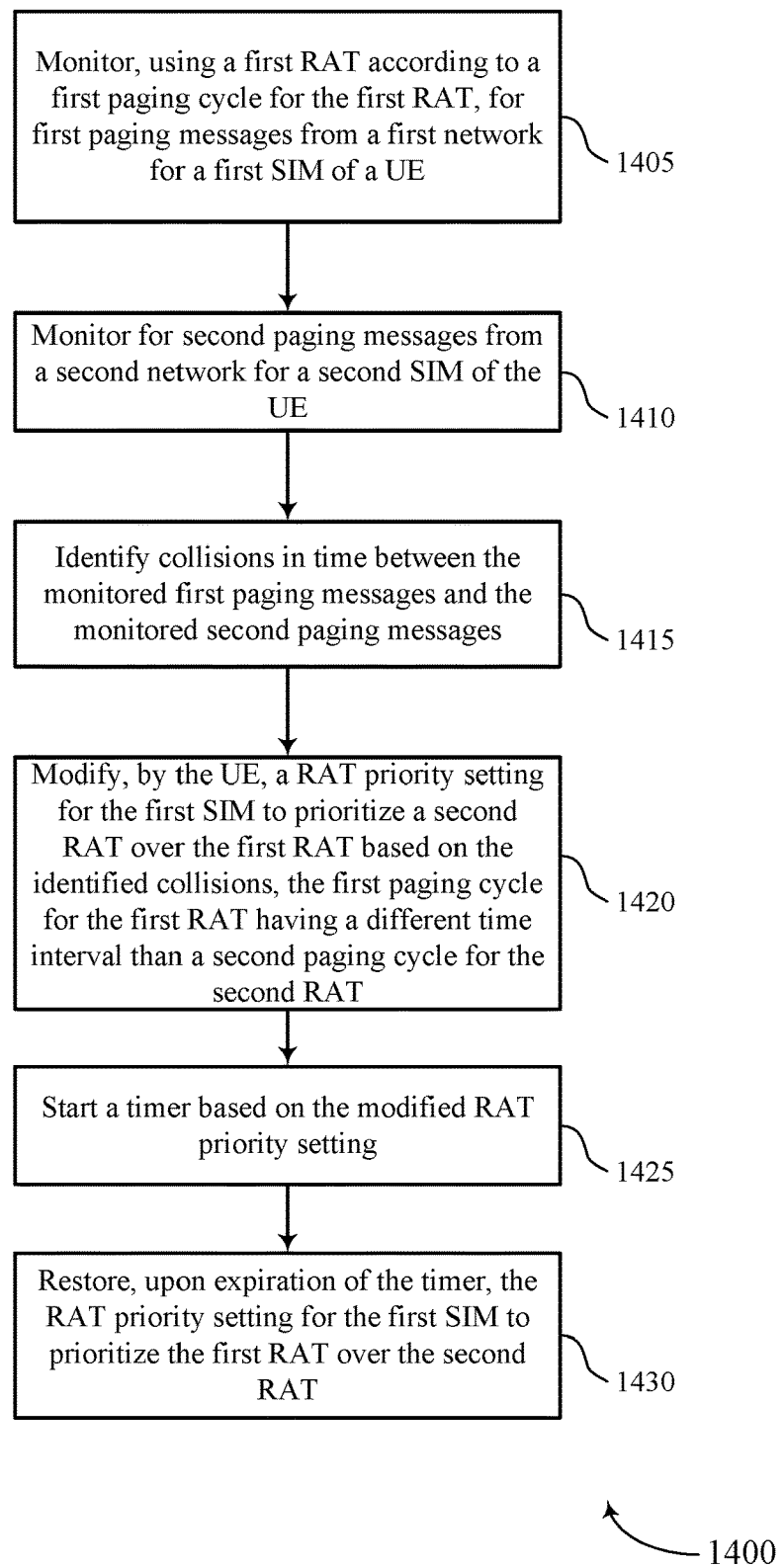

FIG. 14 shows a flowchart illustrating a method 1400 for techniques for mitigating page collisions in dual SIM devices in accordance with aspects of the present disclosure. The operations of method 1400 may be implemented by a UE 115 or its components as described herein. For example, the operations of method 1400 may be performed by a communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may monitor, using a first RAT according to a first paging cycle for the first RAT, for first paging messages from a first network for a first SIM of a UE. The operations of block 1405 may be performed according to the methods described herein. In certain examples, aspects of the operations of block 1405 may be performed by a paging message manager as described with reference to FIGS. 8 through 11.

At block 1410 the UE 115 may monitor for second paging messages from a second network for a second SIM of the UE. The operations of block 1410 may be performed according to the methods described herein. In certain examples, aspects of the operations of block 1410 may be performed by a paging message manager as described with reference to FIGS. 8 through 11.

At block 1415 the UE 115 may identify collisions in time between the monitored first paging messages and the monitored second paging messages. The operations of block 1415 may be performed according to the methods described herein. In certain examples, aspects of the operations of block 1415 may be performed by a persistent collision manager as described with reference to FIGS. 8 through 11.

At block 1420 the UE 115 may modify a RAT priority setting for the first SIM to prioritize a second RAT over the first RAT based at least in part on the identified collisions, the first paging cycle for the first RAT having a different time interval than a second paging cycle for the second RAT. The operations of block 1420 may be performed according to the methods described herein. In certain examples, aspects of the operations of block 1420 may be performed by a fallback state manager as described with reference to FIGS. 8 through 11.

At block 1425 the UE 115 may start a timer based at least in part on the modified RAT priority setting. The operations of block 1425 may be performed according to the methods described herein. In certain examples, aspects of the operations of block 1425 may be performed by a fallback timer manager as described with reference to FIGS. 8 through 11.

At block 1430 the UE 115 may restore, upon expiration of the timer, the RAT priority setting for the first SIM to prioritize the first RAT over the second RAT. The operations of block 1430 may be performed according to the methods described herein. In certain examples, aspects of the operations of block 1430 may be performed by a fallback state manager as described with reference to FIGS. 8 through 11.

Figure 15:
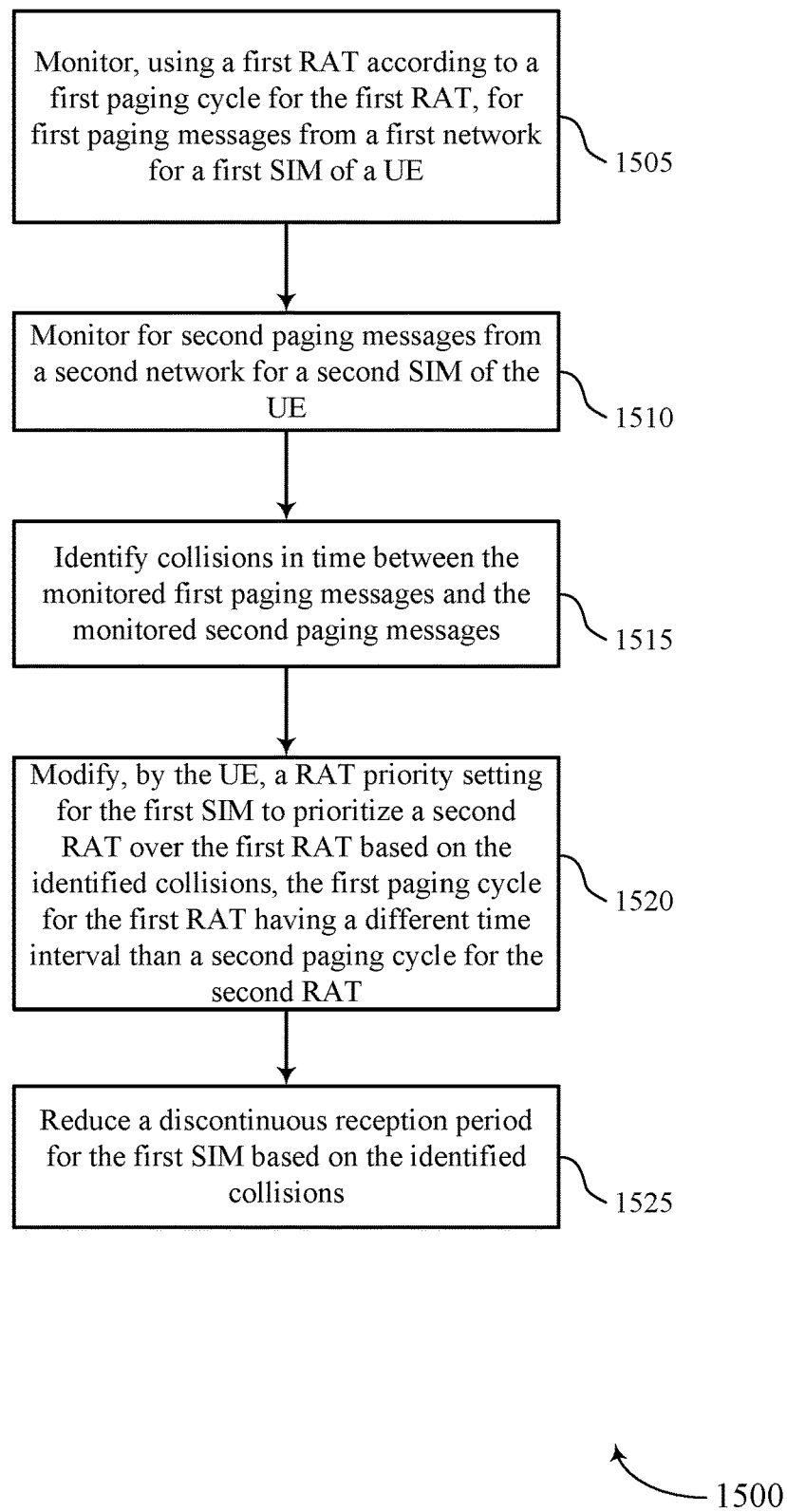

FIG. 15 shows a flowchart illustrating a method 1500 for techniques for mitigating page collisions in dual SIM devices in accordance with aspects of the present disclosure. The operations of method 1500 may be implemented by a UE 115 or its components as described herein. For example, the operations of method 1500 may be performed by a communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may monitor, using a first RAT according to a first paging cycle for the first RAT, for first paging messages from a first network for a first SIM of a UE. The operations of block 1505 may be performed according to the methods described herein. In certain examples, aspects of the operations of block 1505 may be performed by a paging message manager as described with reference to FIGS. 8 through 11.

At block 1510 the UE 115 may monitor for second paging messages from a second network for a second SIM of the UE. The operations of block 1510 may be performed according to the methods described herein. In certain examples, aspects of the operations of block 1510 may be performed by a paging message manager as described with reference to FIGS. 8 through 11.

At block 1515 the UE 115 may identify collisions in time between the monitored first paging messages and the monitored second paging messages. The operations of block 1515 may be performed according to the methods described herein. In certain examples, aspects of the operations of block 1515 may be performed by a persistent collision manager as described with reference to FIGS. 8 through 11.

At block 1520 the UE 115 may modify a RAT priority setting for the first SIM to prioritize a second RAT over the first RAT based at least in part on the identified collisions, the first paging cycle for the first RAT having a different time interval than a second paging cycle for the second RAT. The operations of block 1520 may be performed according to the methods described herein. In certain examples, aspects of the operations of block 1520 may be performed by a fallback state manager as described with reference to FIGS. 8 through 11.

At block 1525 the UE 115 may reduce a discontinuous reception period for the first SIM based at least in part on the identified collisions. The operations of block 1525 may be performed according to the methods described herein. In certain examples, aspects of the operations of block 1525 may be performed by a DRX duration manager as described with reference to FIGS. 8 through 11.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
monitoring, using a first radio access technology (RAT) according to a first paging cycle for the first RAT, for first paging messages from a first network for a first subscriber identify module (SIM) of a user equipment (UE);
monitoring for second paging messages from a second network for a second SIM of the UE;
identifying collisions in time between the monitored first paging messages and the monitored second paging messages; and
modifying, by the UE, a RAT priority setting for the first SIM from prioritizing the first RAT over a second RAT to prioritizing the second RAT over the first RAT based at least in part on the identified collisions, the first paging cycle for the first RAT having a different time interval than a second paging cycle for the second RAT.

2. The method of claim 1, further comprising:
receiving paging messages from the first network for the first SIM using the second RAT based at least in part on the modified RAT priority setting.

3. The method of claim 1, further comprising:
starting a timer based at least in part on the modified RAT priority setting; and
restoring, upon expiration of the timer, the RAT priority setting for the first SIM to prioritize the first RAT over the second RAT.

4. The method of claim 1, further comprising:
identifying a change in a mobility condition of the UE; and
starting a timer for the UE to remain in a wait state based at least in part on the identified change.

5. The method of claim 4, further comprising:
identifying, while the timer is active, further collisions between the monitored first paging messages and the monitored second paging messages; and
maintaining the modified RAT priority setting for the first SIM to prioritize the second RAT over the first RAT based at least in part on the identified further collisions.

6. The method of claim 4, further comprising:
restoring, upon expiration of the timer, the RAT priority setting for the first SIM to prioritize the first RAT over the second RAT.

7. The method of claim 4, wherein:
the change in the mobility condition of the UE includes the first RAT or a third RAT is active for the first SIM, a discontinuous reception cycle for a second SIM change, a RAT used by the second SIM change, a discontinuous reception cycle for the first RAT or a third RAT for the first SIM change, or a combination thereof.

8. The method of claim 4, further comprising:
identifying, while the timer is active, further collisions between the monitored first paging messages and the monitored second paging messages;
identifying, while the timer is active, that the first SIM of the UE is using a third RAT; and
modifying, by the UE, the RAT priority setting for the first SIM to prioritize the first RAT over the second RAT and the third RAT based at least in part on the further identified collisions and the identification that the first SIM is using the third RAT while the timer is active.

9. The method of claim 4, further comprising:
identifying, while the timer is active, that the second RAT for the first SIM is active;
identifying, while the timer is active, that the first RAT for the first SIM has a highest priority of the RAT priority setting; and
modifying, by the UE, the RAT priority setting for the first SIM to prioritize the first RAT over the second RAT and a third RAT based at least in part on the identification that the second RAT is active for the first SIM and the identification that the first SIM is using the third RAT while the timer is active.

10. The method of claim 1, further comprising:
performing a reselection procedure with the first network using the second RAT based at least in part on the modified RAT priority setting.

11. The method of claim 1, wherein:
identifying collisions between the monitored first paging messages and the monitored second paging messages comprises: identifying that a paging block rate for the monitored first paging messages, or the monitored second paging messages, or a combination thereof, exceeds a predetermined threshold.

12. The method of claim 1, further comprising:
receiving one or more system information blocks for the first SIM that indicate priority settings for the first RAT and the second RAT, wherein modifying the RAT priority setting for the first SIM comprises overriding the indicated priority setting for the first RAT, or the indicated priority setting for the second RAT, or a combination thereof.

13. The method of claim 12, wherein:
the received one or more system information blocks comprise: a system information block for reselection to an evolved universal terrestrial radio access (E-UTRA) cell, a system information block for reselection to a universal terrestrial radio access network (UTRAN) cell, a system information block for reselection to a global system for mobile communication (GSM) enhanced data rates for GSM evolution (EDGE) radio access network (GERAN) cell, or a combination thereof.

14. The method of claim 1, wherein the first paging cycle for the first RAT is a non-integer multiple of the second paging cycle for the second RAT.

15. The method of claim 1, wherein:
the first RAT is one of long term evolution (LTE), wideband code division multiple access (WCDMA), global system for mobile communication (GSM), and 5G wireless technology; and
the second RAT is one of LTE, WCDMA, GSM, and 5G wireless technology, wherein the first RAT is different from the second RAT.

16. The method of claim 1, wherein:
monitoring for second paging messages monitoring, using a third RAT, for the second paging messages from the second network for the second SIM of the UE; and
the method further comprises modifying, by the UE, a RAT priority setting for the second SIM to prioritize a fourth RAT over the third RAT based at least in part on the identified collisions.

17. An apparatus for wireless communication, comprising:
a processor;
memory in electronic communication with the processor; and
instructions stored in the memory and operable, when executed by the processor, to cause the apparatus to:
monitor, using a first radio access technology (RAT) according to a first paging cycle for the first RAT, for first paging messages from a first network for a first subscriber identify module (SIM) of a user equipment (UE);
monitor for second paging messages from a second network for a second SIM of the UE;
identify collisions in time between the monitored first paging messages and the monitored second paging messages; and
modify, by the UE, a RAT priority setting for the first SIM from prioritizing the first RAT over a second RAT to prioritizing the second RAT over the first RAT based at least in part on the identified collisions, the first paging cycle for the first RAT having a different time interval than a second paging cycle for the second RAT.

18. The apparatus of claim 17, wherein the instructions are further executable by the processor to:
receive paging messages from the first network for the first SIM using the second RAT based at least in part on the modified RAT priority setting.

19. The apparatus of claim 17, wherein the instructions are further executable by the processor to:
start a timer based at least in part on the modified RAT priority setting; and
restore, upon expiration of the timer, the RAT priority setting for the first SIM to prioritize the first RAT over the second RAT.

20. The apparatus of claim 17, wherein the instructions are further executable by the processor to:
identify a change in a mobility condition of the UE; and
start a timer for the UE to remain in a wait state based at least in part on the identified change.

21. The apparatus of claim 20, wherein the instructions are further executable by the processor to:
identify, while the timer is active, further collisions between the monitored first paging messages and the monitored second paging messages; and
maintain the modified RAT priority setting for the first SIM to prioritize the second RAT over the first RAT based at least in part on the identified further collisions.

22. The apparatus of claim 20, wherein the instructions are further executable by the processor to:
restore, upon expiration of the timer, the RAT priority setting for the first SIM to prioritize the first RAT over the second RAT.

23. The apparatus of claim 20, wherein:
the change in the mobility condition of the UE includes the first RAT or a third RAT is active for the first SIM, a discontinuous reception cycle for a second SIM change, a RAT used by the second SIM change, a discontinuous reception cycle for the first RAT or a third RAT for the first SIM change, or a combination thereof.

24. The apparatus of claim 20, wherein the instructions are further executable by the processor to:
identify, while the timer is active, further collisions between the monitored first paging messages and the monitored second paging messages;
identify, while the timer is active, that the first SIM of the UE is using a third RAT; and
modify, by the UE, the RAT priority setting for the first SIM to prioritize the first RAT over the second RAT and the third RAT based at least in part on the identified further collisions and the identification that the first SIM is using the third RAT while the timer is active.

25. The apparatus of claim 20, wherein the instructions are further executable by the processor to:
identify, while the timer is active, that the second RAT for the first SIM is active;
identify, while the timer is active, that the first RAT for the first SIM has a highest priority of the RAT priority setting; and
modify, by the UE, the RAT priority setting for the first SIM to prioritize the first RAT over the second RAT and a third RAT based at least in part on the identification that the second RAT is active for the first SIM and the identification that the first SIM is using the third RAT while the timer is active.

26. The apparatus of claim 17, wherein the instructions are further executable by the processor to:
perform a reselection procedure with the first network using the second RAT based at least in part on the modified RAT priority setting.

27. The apparatus of claim 17, wherein the instructions executable by the processor to identify collisions between the monitored first paging messages and the monitored second paging messages comprise instructions executable by the processor to:
identify that a paging block rate for the monitored first paging messages, or the monitored second paging messages, or a combination thereof, exceeds a predetermined threshold.

28. The apparatus of claim 17, wherein the first paging cycle for the first RAT is a non-integer multiple of the second paging cycle for the second RAT.

29. An apparatus for wireless communication, comprising:
means for monitoring, using a first radio access technology (RAT) according to a first paging cycle for the first RAT, for first paging messages from a first network for a first subscriber identify module (SIM) of a user equipment (UE);
means for monitoring for second paging messages from a second network for a second SIM of the UE;
means for identifying collisions in time between the monitored first paging messages and the monitored second paging messages; and
means for modifying, by the UE, a RAT priority setting for the first SIM from prioritizing the first RAT over a second RAT to prioritizing the second RAT over the first RAT based at least in part on the identified collisions, the first paging cycle for the first RAT having a different time interval than a second paging cycle for the second RAT.

30. A non-transitory computer readable medium storing code for wireless communication, the code comprising instructions executable by a processor to:
monitor, using a first radio access technology (RAT) according to a first paging cycle for the first RAT, for first paging messages from a first network for a first subscriber identify module (SIM) of a user equipment (UE);
monitor for second paging messages from a second network for a second SIM of the UE;
identify collisions in time between the monitored first paging messages and the monitored second paging messages; and
modify, by the UE, a RAT priority setting for the first SIM from prioritizing the first RAT over a second RAT to prioritizing the second RAT over the first RAT based at least in part on the identified collisions, the first paging cycle for the first RAT having a different time interval than a second paging cycle for the second RAT.

* * * * *